United States Patent
Miyata

(10) Patent No.: US 11,673,571 B2
(45) Date of Patent: Jun. 13, 2023

(54) VEHICLE SURROUNDING MONITORING APPARATUS

(71) Applicant: TOYOTA JIDOSHA KABUSHIKI KAISHA, Toyota (JP)

(72) Inventor: Tomoki Miyata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 53 days.

(21) Appl. No.: 17/369,257

(22) Filed: Jul. 7, 2021

(65) Prior Publication Data

US 2022/0009514 A1    Jan. 13, 2022

(30) Foreign Application Priority Data

Jul. 8, 2020 (JP) .............................. JP2020-117531

(51) Int. Cl.
*B60W 50/14* (2020.01)
*G06V 20/58* (2022.01)

(52) U.S. Cl.
CPC ............ *B60W 50/14* (2013.01); *G06V 20/58* (2022.01); *B60W 2050/146* (2013.01); *B60W 2540/30* (2013.01)

(58) Field of Classification Search
None
See application file for complete search history.

(56) References Cited

U.S. PATENT DOCUMENTS

| | | | | |
|---|---|---|---|---|
| 9,463,741 | B2* | 10/2016 | Fukuda | G06V 20/56 |
| 9,475,492 | B2* | 10/2016 | Okano | B62D 15/028 |
| 9,505,404 | B2* | 11/2016 | Jones | B60W 10/04 |
| 10,007,262 | B1* | 6/2018 | Schwindt | G05D 1/0061 |
| 10,202,076 | B2* | 2/2019 | Baek | B60R 1/002 |
| 10,360,459 | B2* | 7/2019 | Itoh | H04N 5/33 |
| 10,363,872 | B2* | 7/2019 | Kubota | B60R 1/00 |
| 10,836,392 | B2* | 11/2020 | Tokuhiro | B60W 30/18154 |
| 10,936,884 | B2* | 3/2021 | Diessner | G08G 1/167 |
| 11,365,527 | B2* | 6/2022 | Kiyota | E02F 9/24 |
| 11,443,517 | B1* | 9/2022 | Kalagher | G06V 10/60 |

(Continued)

FOREIGN PATENT DOCUMENTS

| | | | | |
|---|---|---|---|---|
| AU | 2016245064 A1 * | 11/2017 | | B60G 99/00 |
| AU | 2016245064 B2 * | 7/2019 | | B60G 99/00 |

(Continued)

*Primary Examiner* — Kevin R Steckbauer
(74) *Attorney, Agent, or Firm* — Sughrue Mion, PLLC

(57) ABSTRACT

A vehicle surrounding monitoring apparatus executes an underfloor object informing process for informing occupants of a vehicle of a probability that there is an object under the vehicle. When an object around the vehicle is detected, the vehicle surrounding monitoring apparatus memorizes information on the object as real-time object information. When the object which had been detected, is not detected, the vehicle surrounding monitoring apparatus acquires information on a moving of the object which had been detected for a predetermined time period as past object information, based on the memorized real-time object information. When determining that there is the object which had been detected under the vehicle, based on the past object information, the vehicle surrounding monitoring apparatus executes the underfloor object informing process.

8 Claims, 16 Drawing Sheets

(56) References Cited

U.S. PATENT DOCUMENTS

| | | | | |
|---|---|---|---|---|
| 2015/0258989 | A1* | 9/2015 | Okano | B60W 40/105 |
| | | | | 701/1 |
| 2015/0307024 | A1* | 10/2015 | Fukuda | G06V 20/58 |
| | | | | 382/103 |
| 2016/0101734 | A1* | 4/2016 | Baek | H04N 7/181 |
| | | | | 348/148 |
| 2016/0297430 | A1* | 10/2016 | Jones | B60W 50/14 |
| 2017/0293812 | A1* | 10/2017 | Itoh | G02B 27/283 |
| 2018/0111553 | A1* | 4/2018 | Kubota | G06V 20/56 |
| 2018/0181120 | A1* | 6/2018 | Schwindt | G05D 1/0061 |
| 2019/0061764 | A1* | 2/2019 | Tokuhiro | B60W 50/14 |
| 2020/0057897 | A1* | 2/2020 | Matsuura | G06V 20/58 |
| 2021/0053559 | A1* | 2/2021 | Wang | B60T 7/22 |
| 2021/0237716 | A1* | 8/2021 | Prasad | B60W 10/04 |
| 2022/0009514 | A1* | 1/2022 | Miyata | G06V 20/58 |
| 2022/0194158 | A1* | 6/2022 | Kim | B60Q 9/005 |
| 2022/0281475 | A1* | 9/2022 | Kumar | B60W 60/001 |
| 2023/0032998 | A1* | 2/2023 | Kushwaha | B60R 25/31 |
| 2023/0059075 | A1* | 2/2023 | Michitarian | B60W 50/00 |

FOREIGN PATENT DOCUMENTS

| | | | | |
|---|---|---|---|---|
| CN | 105007449 | A * | 10/2015 | B60Q 9/008 |
| CN | 105936275 | A * | 9/2016 | B60K 35/00 |
| CN | 112837352 | A * | 5/2021 | G01C 21/165 |
| CN | 113212427 | A * | 8/2021 | B60L 50/66 |
| CN | 112837352 | B * | 11/2021 | G01C 21/165 |
| CN | 113978361 | A * | 1/2022 | B60W 50/14 |
| CN | 114096875 | A * | 2/2022 | G01S 13/867 |
| CN | 114655117 | A * | 6/2022 | B60G 17/0165 |
| DE | 102012013734 | A9 * | 6/2013 | B60W 30/095 |
| DE | 102015208782 | A1 * | 11/2015 | B60R 1/00 |
| DE | 102016002388 | A1 * | 9/2016 | B60K 35/00 |
| DE | 102017216791 | A1 * | 5/2019 | |
| DE | 102019118090 | A1 * | 5/2020 | B60Q 1/0023 |
| DE | 102019210058 | B3 * | 12/2020 | G06K 9/00805 |
| DE | 102019117822 | A1 * | 1/2021 | B60R 11/04 |
| DE | 102021100551 | A1 * | 8/2021 | B60L 50/66 |
| DE | 102021210006 | B3 * | 9/2022 | |
| EP | 2937811 | A1 * | 10/2015 | B60Q 9/008 |
| EP | 3009302 | A2 * | 4/2016 | B60C 23/06 |
| EP | 3229011 | A1 * | 10/2017 | G01N 21/21 |
| EP | 3009302 | B1 * | 12/2017 | B60C 23/06 |
| EP | 2937811 | B1 * | 10/2018 | B60Q 9/008 |
| EP | 3280606 | B1 * | 1/2019 | B60G 99/00 |
| EP | 3229011 | B1 * | 8/2019 | G01N 21/21 |
| EP | 3563205 | B1 * | 3/2022 | G05D 1/0055 |
| EP | 4023525 | A1 * | 7/2022 | |
| GB | 2563935 | A * | 1/2019 | B64C 13/16 |
| JP | 2007-230319 | A | 9/2007 | |
| JP | 2007230319 | A * | 9/2007 | |
| JP | 2007-279892 | A | 10/2007 | |
| JP | 2014-075039 | A | 4/2014 | |
| JP | 2014-236492 | A | 12/2014 | |
| JP | 2015-075372 | A | 4/2015 | |
| JP | 2016162448 | A * | 9/2016 | B60K 35/00 |
| JP | 2016-197785 | A1 | 11/2016 | |
| JP | 2019-121250 | A | 7/2019 | |
| JP | 6801965 | B2 * | 12/2020 | B60K 35/00 |
| JP | 2022014975 | A * | 1/2022 | B60W 50/14 |
| WO | WO-2016158984 | A1 * | 10/2016 | B60R 1/00 |
| WO | WO-2016162226 | A1 * | 10/2016 | B60G 99/00 |
| WO | WO-2018122104 | A1 * | 7/2018 | G05D 1/0055 |
| WO | WO-2021001224 | A1 * | 1/2021 | B60R 11/04 |
| WO | WO-2021004886 | A1 * | 1/2021 | G06K 9/00805 |
| WO | WO-2021006098 | A1 * | 1/2021 | G01S 13/867 |

* cited by examiner

VEHICLE SURROUNDING MONITORING APPARATUS

BACKGROUND

Field

The invention relates to a vehicle surrounding monitoring apparatus.

Description of the Related Art

There is known a vehicle surrounding monitoring apparatus which displays an image of a space under a floor of a vehicle on a display in order for a driver of the vehicle to recognize a state of the space under the floor of the vehicle (for example, see JP 2016-197785 A).

The vehicle surrounding monitoring apparatus memorizes images around the vehicle taken by cameras, produces the image of the present state of the space under the floor of the vehicle, based on the memorized images around the vehicle, a moving speed of the vehicle, and a moving direction of the vehicle, and displays the produced image on the display. Hereinafter, the image of the space under the floor of the vehicle will be referred to as "underfloor image".

Humans or animals may crawl into the space under the floor of the vehicle. If the driver drives the vehicle without knowing the humans or the animals under the floor of the vehicle, the vehicle may injure the humans or the animals.

The known vehicle surrounding monitoring apparatus uses the past images around the vehicle to produce the present underfloor image. Thus, the produced underfloor image is a past image. Thus, the underfloor image displayed on the display may not provide the present state of the space under the floor of the vehicle. Thus, the driver cannot know the humans or the animals under the floor of the vehicle from the underfloor image displayed on the display.

SUMMARY

The invention has been made for solving the above-mentioned problems. An object of the invention is to provide a vehicle surrounding monitoring apparatus which informs the driver of the vehicle of the humans or the animals under the floor of the vehicle.

According to the invention, a vehicle surrounding monitoring apparatus executes an underfloor object informing process for informing occupants of an own vehicle of a probability that there is at least one object under a floor of the own vehicle. The vehicle surrounding monitoring apparatus according to the invention comprises (i) a detecting apparatus which detects a situation around the own vehicle and (ii) an electronic control unit which executes the underfloor object informing process.

The electronic control unit is configured to acquire detection information on the situation around the own vehicle detected by the detecting apparatus. Further, the electronic control unit is configured to, when the electronic control unit determines that the detecting apparatus detects at least one object around the own vehicle, based on the detection information, memorize information on the detected object as real-time object information. Further, the electronic control unit is configured to, when the electronic control unit determines that the detecting apparatus does not detect the object which the detecting apparatus had detected, based on the detection information, acquire information on a moving of the object which the detecting apparatus had detected for a predetermined time period as past object information, based on the memorized real-time object information. Further, the electronic control unit is configured to, when the electronic control unit determines that there is the object which the detecting apparatus had detected under the floor of the own vehicle, based on the past object information, determine that an informing condition is satisfied. Further, the electronic control unit is configured to, when the electronic control unit determines that the informing condition is satisfied, execute the underfloor object informing process.

Thereby, the vehicle surrounding monitoring apparatus according to the invention executes the underfloor object informing process when there is the object probably under the floor of the own vehicle. Thus, a driver of the own vehicle can know the probability that there is the object under the floor of the own vehicle.

According to an aspect of the invention, the real-time object information may include a moving direction of the detected object. The past object information may include the moving direction of the detected object memorized as the real-time object information. The electronic control unit may be configured to determine that the informing condition is satisfied when the moving direction of the detected object acquired as the past object information corresponds to a direction to reach the own vehicle.

Thereby, the vehicle surrounding monitoring apparatus according to this aspect of the invention determines that there is the object probably under the floor of the own vehicle when the detected object moves in the direction to reach the own vehicle. Thus, the vehicle surrounding monitoring apparatus can exactly determine the probability that there is the object under the floor of the own vehicle.

According to another aspect of the invention, the real-time object information may include (i) a moving direction of the detected object, (ii) a relative distance between the detected object and the own vehicle, and (iii) a relative speed of the detected object relative to the own vehicle. The past object information may include (i) the moving direction of the detected object memorized as the real-time object information, and (ii) a moving distance of the detected object for the predetermined time period calculated, based on the predetermined time period and the relative speed memorized as the real-time object information. The electronic control unit may be configured to determine that the informing condition is satisfied when (i) the moving direction of the detected object acquired as the past object information corresponds to a direction to reach the own vehicle, and (ii) the calculated moving distance is greater than the memorized relative distance.

Thereby, the vehicle surrounding monitoring apparatus according to this aspect of the invention determines that there is the object probably under the floor of the own vehicle when (i) the object moves in the direction to reach the own vehicle, and (ii) the object has presumably moved a distance to reach the own vehicle. Thus, the vehicle surrounding monitoring apparatus can exactly determine the probability that there is the object under the floor of the own vehicle.

According to further another aspect of the invention, the vehicle surrounding monitoring apparatus may comprise a display. The detecting apparatus may include a camera sensor apparatus. The electronic control unit may be configured to display an underfloor image on the display. The underfloor image is an image of a space under the floor of the own vehicle of this time produced, based on images taken by the camera sensor apparatus. Further, the electronic control unit may be configured to, when the electronic control unit determines that the informing condition is satisfied, execute the underfloor object informing process by displaying an underfloor object informing image on the display, overlapping the underfloor image to direct the occupants' attention to the space under the floor of the own vehicle.

Thereby, the driver can know the probability that there is/are the objects under the floor of the own vehicle from the display.

According to further another aspect of the invention, the electronic control unit may be configured to execute a process of determining whether the informing condition is satisfied when a moving speed of the own vehicle is smaller than or equal to a predetermined speed.

When the own vehicle moves at a low speed, the object may easily crawl into the space under the floor of the own vehicle. The vehicle surrounding monitoring apparatus according to this aspect of the invention executes the process of determining whether the informing condition is satisfied when the moving speed of the own vehicle is smaller than or equal to the predetermined speed. Thus, wasted execution of the process of determining whether the informing condition is satisfied, can be prevented.

According to further another aspect of the invention, the electronic control unit may be configured to execute a process of determining whether the informing condition is satisfied when a moving speed of the own vehicle is zero.

When the own vehicle is stopped, the object easily crawls into the space under the floor of the own vehicle. The vehicle surrounding monitoring apparatus according to this aspect of the invention executes the process of determining whether the informing condition is satisfied when the moving speed of the own vehicle is zero. Thus, the wasted execution of the process of determining whether the informing condition is satisfied, can be prevented.

According to further another aspect of the invention, the detecting apparatus may include (i) a camera sensor apparatus and (ii) an electromagnetic wave sensor apparatus. The electronic control unit may be configured to, when the own vehicle is deenergized, acquire the detection information from the electromagnetic wave sensor apparatus without acquiring the detection information from the camera sensor apparatus. Further, the electronic control unit may be configured to, when the electronic control unit determines that the electromagnetic wave sensor apparatus detects the object around the own vehicle, based on the detection information acquired from the electromagnetic wave sensor apparatus, acquire the detection information from the camera sensor apparatus. Further, the electronic control unit may be configured to memorize the real-time object information, based on the detection information acquired from the camera sensor apparatus. Further, the electronic control unit may be configured to, when the electronic control unit determines that the camera sensor apparatus does not detect the object which the camera sensor apparatus had detected, based on the detection information acquired from the camera sensor apparatus, acquire the past object information, based on the memorized real-time object information.

Thereby, the vehicle surrounding monitoring apparatus according to this aspect of the invention can execute a process of determining whether there is the object under the floor of the own vehicle with a small amount of electric power consumed.

According to further another aspect of the invention, the vehicle surrounding monitoring apparatus may comprise an acceleration sensor which detects an acceleration of the own vehicle. The detecting apparatus may include a camera sensor apparatus. The electronic control unit may be configured to, when the own vehicle is deenergized, acquire information from the acceleration sensor without acquiring the detection information from the camera sensor apparatus. Further, the electronic control unit may be configured to, when the electronic control unit determines that a movement of the own vehicle is detected, based on the information acquired from the acceleration sensor, acquire the detection information from the camera sensor apparatus. Further, the electronic control unit may be configured to memorize the real-time object information, based on the detection information acquired from the camera sensor apparatus. Further, the electronic control unit may be configured to, when the electronic control unit determines that the camera sensor apparatus does not detect the object which the camera sensor apparatus had detected, based on the detection information acquired from the camera sensor apparatus, acquire the past object information, based on the memorized real-time object information.

Thereby, the vehicle surrounding monitoring apparatus according to this aspect of the invention can execute the process of determining whether there is the object under the floor of the own vehicle with the small amount of the electric power consumed.

According to further another aspect of the invention, the electronic control unit may be configured to execute the underfloor object informing process when (i) the informing condition is satisfied, and (ii) the own vehicle is energized.

Thereby, the driver can know the probability that there is the object under the floor of the own vehicle Elements of the invention are not limited to elements of embodiments and modified examples of the invention described along with the drawings. The other objects, features and accompanied advantages of the invention can be easily understood from the embodiments and the modified examples of the invention.

DESCRIPTION OF THE EMBODIMENTS

Figure 1:
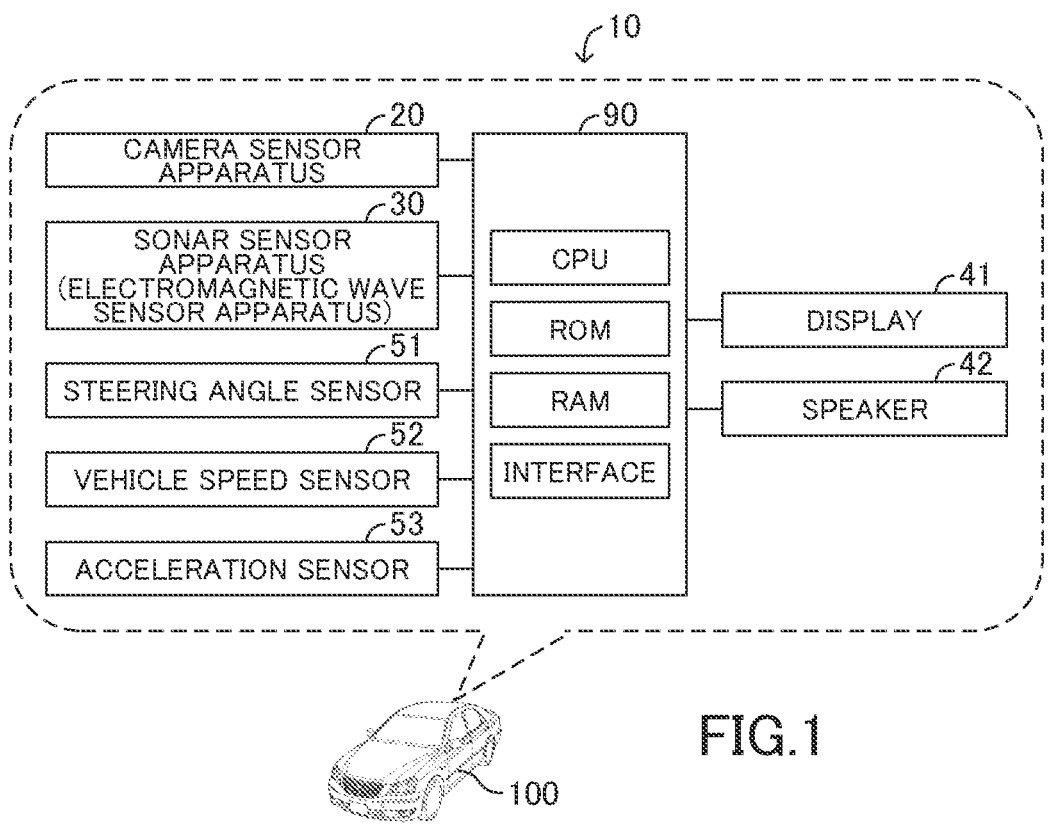
FIG. 1 is a view showing a vehicle surrounding monitoring apparatus according to an embodiment of the invention and a vehicle installed with the vehicle surrounding monitoring apparatus.

Below, a vehicle surrounding monitoring apparatus according to an embodiment of the invention will be described with reference to the drawings. As shown in FIG. 1, the vehicle surrounding monitoring apparatus 10 according to the embodiment of the invention is installed on an own vehicle 100.

The vehicle surrounding monitoring apparatus 10 includes an ECU 90. The ECU 90 includes a CPU, a ROM, a RAM, and an interface.

<Camera Sensor Apparatus>

A camera sensor apparatus 20 is installed on the own vehicle 100 as a detecting apparatus for detecting a situation surrounding the own vehicle 100. The camera sensor apparatus 20 includes a front camera 21, a rear camera 22, a left camera 23, and a right camera 24. Hereinafter, the front camera 21, the rear camera 22, the left camera 23, and the right camera 24 will be collectively referred to as "cameras 25".

Figure 2:
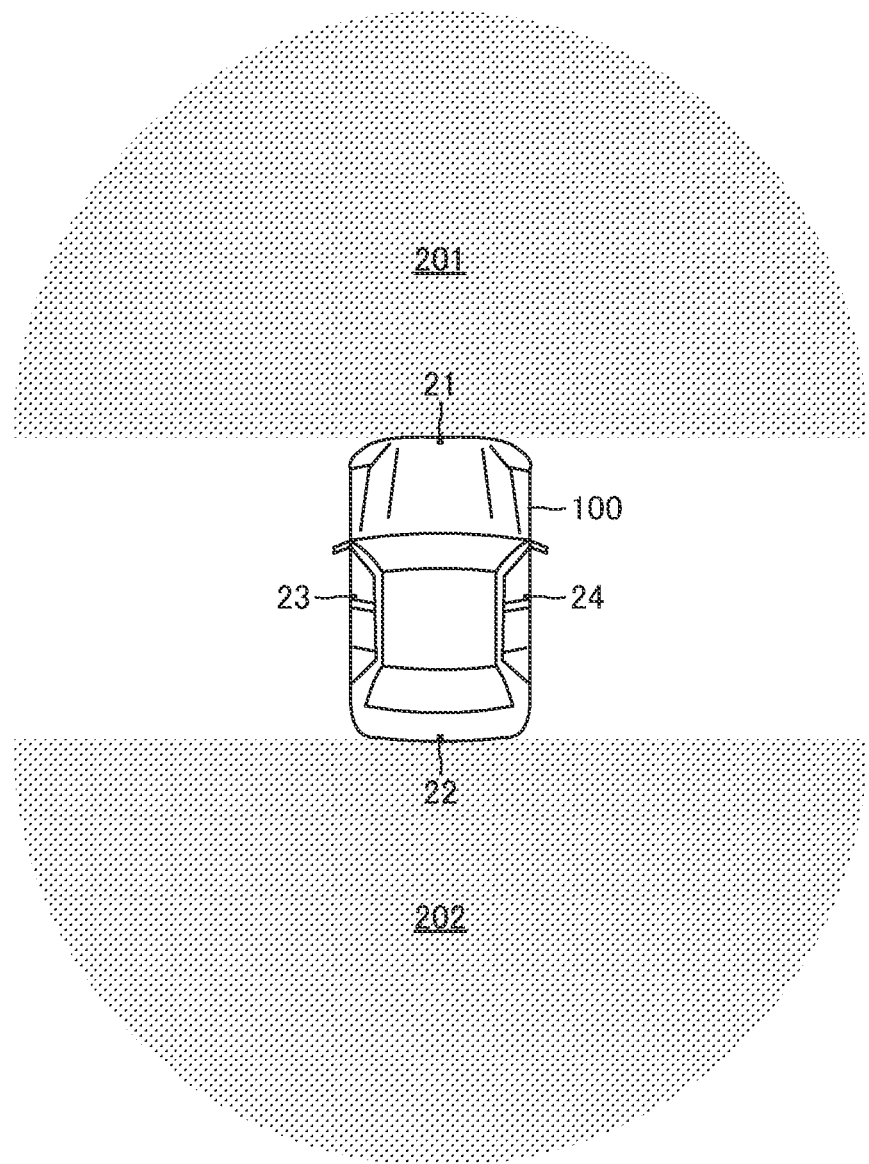
FIG. 2 is a view showing imaging areas of a front camera and a rear camera.
Figure 3:
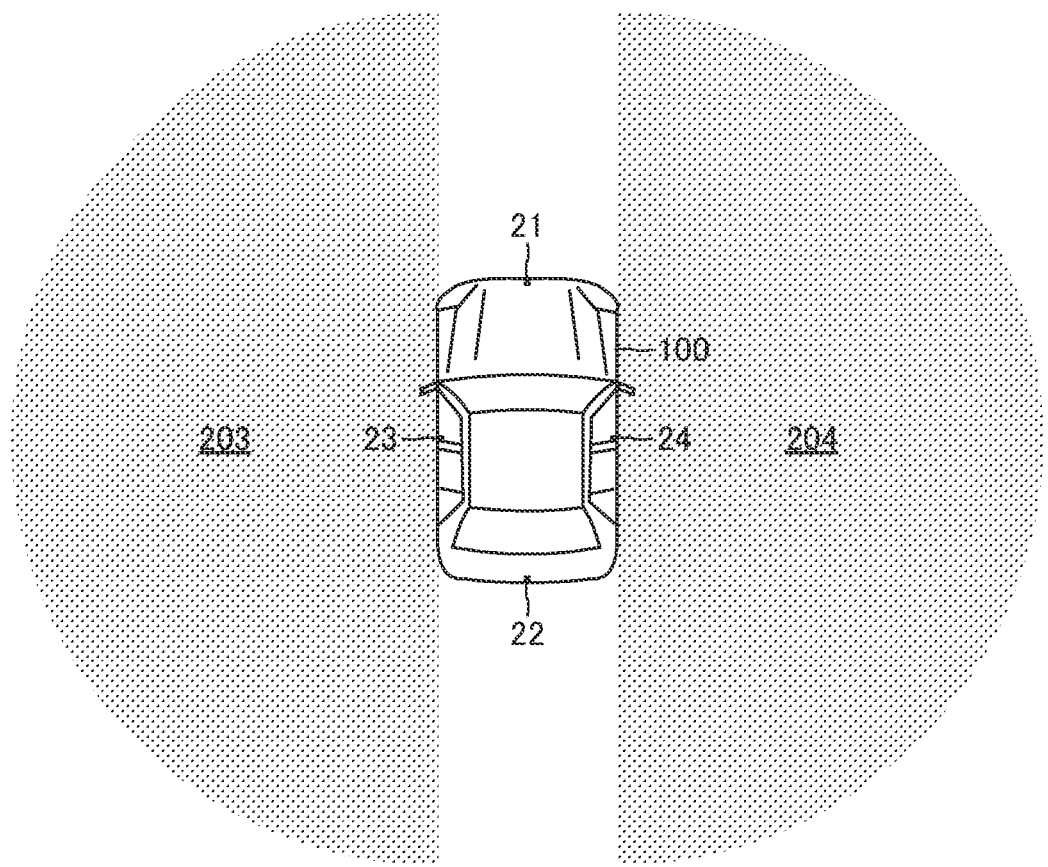
FIG. 3 is a view showing imaging areas of a left camera and a right camera.

As shown in FIG. 2, the front camera 21 is attached to the own vehicle 100 to take images of a predetermined area 201 on the front side of the own vehicle 100. The rear camera 22 is attached to the own vehicle 100 to take images of a predetermined area 202 on the rear side of the own vehicle 100. As shown in FIG. 3, the left camera 23 is attached to the own vehicle 100 to take images of a predetermined area 203 on the left side of the own vehicle 100. The right camera 24 is attached to the own vehicle 100 to take images of a predetermined area 204 on the right side of the own vehicle 100.

The camera sensor apparatus 20 is electrically connected to the ECU 90. The camera sensor apparatus 20 sends information on the images taken by the cameras 25 to the ECU 90. The ECU 90 acquires the information received from the camera sensor apparatus 20 as detection information. The ECU 90 may determine whether the camera sensor apparatus 20 detects objects around the own vehicle 100, based on the acquired detection information. Hereinafter, the detection information acquired by the ECU 90 from the camera sensor apparatus 20 will be referred to as "camera image information INF_C".

<Sonar Sensor Apparatus>

An electromagnetic wave sensor apparatus 30 is installed on the own vehicle 100 as the detecting apparatus for detecting the situation around the own vehicle 100. In this embodiment, the electromagnetic wave sensor apparatus 30 is a sonar sensor apparatus 30. The sonar sensor apparatus 30 includes twelve clearance sonar. The sonar sensor apparatus 30 includes first to twelfth clearance sonars 301 to 312. Hereinafter, the first to twelfth clearance sonar 301 to 312 will be simply referred to as "first to twelfth sonars 301 to 312", respectively.

Figure 4:
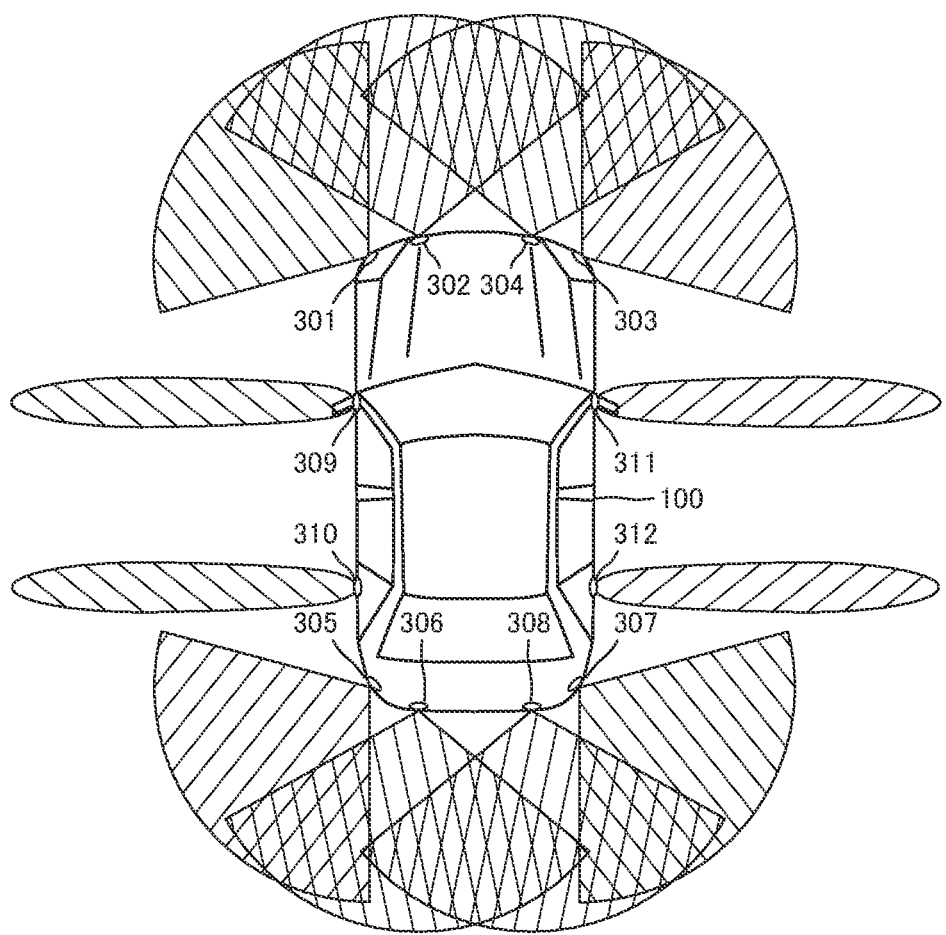
FIG. 4 is a view showing detecting areas of sonar sensor apparatus.

As shown in FIG. 4, the first sonar 301 is attached to the own vehicle 100 at a front left corner thereof and radiates sonic wave in the front left direction from the own vehicle 100. The second sonar 302 is attached to the own vehicle 100 at a left portion of a front end thereof and radiates the sonic wave in the front direction from the own vehicle 100. The third sonar 303 is attached to the own vehicle 100 at a front right corner thereof and radiates the sonic wave in the front right direction from the own vehicle 100. The fourth sonar 304 is attached to the own vehicle 100 at a right portion of the front end thereof and radiates the sonic wave in the front direction from the own vehicle 100.

The fifth sonar 305 is attached to the own vehicle 100 at a rear left corner thereof and radiates the sonic wave in the rear left direction from the own vehicle 100. The sixth sonar 306 is attached to the own vehicle 100 at a left portion of a rear end thereof and radiates the sonic wave in the rear direction from the own vehicle 100. The seventh sonar 307 is attached to the own vehicle 100 at a rear right corner thereof and radiates the sonic wave in the rear right direction from the own vehicle 100. The eighth sonar 308 is attached to the own vehicle 100 at a right portion of the rear end thereof and radiates the sonic wave in the rear direction from the own vehicle 100.

In addition, the ninth sonar 309 is attached to the own vehicle 100 at a front portion of a left end thereof and radiates the sonic wave in the left direction from the own vehicle 100. The tenth sonar 310 is attached to the own vehicle 100 at a rear portion of the left end thereof and radiates the sonic wave in the left direction from the own vehicle 100. The eleventh sonar 311 is attached to the own vehicle 100 at a front portion of a right end thereof and radiates the sonic wave in the right direction from the own vehicle 100. The twelfth sonar 312 is attached to the own vehicle 100 at a rear portion of the right end thereof and radiates the sonic wave in the right direction from the own vehicle 100.

The first sonar 301 to the twelfth sonar 312 receive the sonic wave reflected by the objects.

The sonar sensor apparatus 30 is electrically connected to the ECU 90. The sonar sensor apparatus 30 sends information on (i) the sonic wave radiated from the first sonar 301 to the twelfth sonar 312 and (ii) the sonic wave received by the first sonar 301 to the twelfth sonar 312 to the ECU 90. The ECU 90 acquires the information received from the sonar sensor apparatus 30 as the detection information. The ECU 90 may determine whether the sonar sensor apparatus 30 detects the objects around the own vehicle 100, based on the acquired detection information.

Hereinafter, the detection information acquired by the ECU 90 from the sonar sensor apparatus 30 will be referred to as "sonar information INF_S".

<Display>

A display 41 is installed on the own vehicle 100. The display 41 is electrically connected to the ECU 90. The display 41 is provided on a portion in an interior of the own vehicle 100 in order for a driver of the own vehicle 100 sitting on a driver's seat of the own vehicle 100 to see the display 41. The display 41 displays various images in response to various commands sent from the ECU 90.

<Speaker>

A speaker 42 is installed on the own vehicle 100. The speaker 42 is electrically connected to the ECU 90. The speaker 42 is provided at a portion in the interior of the own vehicle 100 in order for the driver sitting on the driver's seat of the own vehicle 100 to hear sound or voice from the speaker 42. The speaker 42 outputs the sound or voice in response to various commands sent from the ECU 90.

<Other Sensors>

A steering angle sensor 51, a vehicle speed sensor 52, and an acceleration sensor 53 are installed on the own vehicle 100.

The steering angle sensor 51 detects an angle which the driver rotates a steering wheel of the own vehicle 100 with respect to a neutral position. Then, the steering angle sensor 51 sends a signal representing the detected angle to the ECU 90. The ECU 90 acquires the angle which the driver rotates the steering wheel of the own vehicle 100 with respect to the neutral position as a steering angle STA, based on the signal.

The vehicle speed sensor 52 sends pulse signals to the ECU 90 each time a left front wheel, a right front wheel, a left rear wheel, and a right rear wheel of the own vehicle 100 rotate by a predetermined angle. The ECU 90 acquires rotating speeds of the wheels, based on the pulse signals. Then, the ECU 90 acquires a moving speed of the own vehicle 100 as a vehicle speed SPD_V, based on the acquired rotating speeds.

In this embodiment, the acceleration sensor 53 is a gyroscope sensor. The acceleration sensor 53 detects an acceleration in a yaw direction of the own vehicle 100, an acceleration in a roll direction of the own vehicle 100, and an acceleration in a pitch direction of the own vehicle 100. Then, the acceleration sensor 53 sends signals representing the detected accelerations to the ECU 90. The ECU 90 acquires information on the accelerations in the yaw, roll, and pitch directions of the own vehicle 100 as acceleration information INF_G, based on the signals. The ECU 90 may detect movement of the own vehicle 100, based on the acquired acceleration information INF_G.

It should be noted that the acceleration sensor 53 may include a longitudinal acceleration sensor and a lateral acceleration sensor. In this case, the acceleration sensor 53 detects a longitudinal acceleration Gx and a lateral acceleration Gy of the own vehicle 100. Then, the acceleration sensor 53 sends signals representing the detected accelerations Gx and Gy to the ECU 90. The ECU 90 acquires information on the longitudinal acceleration Gx and the lateral acceleration Gy of the own vehicle 100 as the acceleration information INF_G, based on the signals. Also, the ECU 90 may detect the movement of the own vehicle 100, based on the acquired acceleration information INF_G.

<Summary of Operation>

Figure 5:
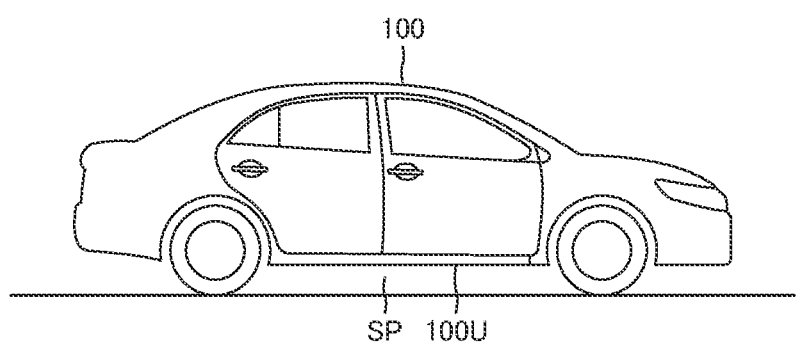
FIG. 5 is a view showing an underfloor space of the vehicle.

Next, a summary of an operation of the vehicle surrounding monitoring apparatus 10 will be described. As shown in FIG. 5, there is a space between a floor 100U of the own vehicle 100 and the ground GR. Humans or animals may crawl into that space. When the vehicle surrounding monitoring apparatus 10 determines that there is/are the object(s) such as the human(s) or the animal(s) probably in the space under the floor 100U of the own vehicle 100, the vehicle surrounding monitoring apparatus 10 executes an underfloor object informing process of informing the driver of the own vehicle 100 of a probability that there is/are the object(s) such as the human(s) or the animal(s) in the space under the floor 100U of the own vehicle 100. Hereinafter, the space under the floor 100U of the own vehicle 100 will be referred to as "underfloor space SP".

In particular, the vehicle surrounding monitoring apparatus 10 executes following processes when the vehicle speed SPD_V is smaller than or equal to a predetermined vehicle speed SPD_th. In this embodiment, the predetermined vehicle speed SPD_th is set to a relatively small value, for example, a maximum value of the vehicle speed SPD_V when the vehicle moves slowly in a parking. However, the predetermined vehicle speed SPD_th may be set to zero. In this case, the vehicle surrounding monitoring apparatus 10 executes the following processes when the vehicle speed SPD_V is zero.

The vehicle surrounding monitoring apparatus 10 executes a process of determining whether the object(s) OBJ such as the human(s) and the animal(s) is/are in the images taken by the cameras 25, based on the camera image information INF_C with a predetermined calculation cycle CYC_cal. In other words, the vehicle surrounding monitoring apparatus 10 executes a process of determining whether the camera sensor apparatus 20 detects the object(s) OBJ around the own vehicle 100, based on the images taken by the cameras 25 with the predetermined calculation cycle CYC_cal. Hereinafter, the images taken by the cameras 25 will be referred to as "camera images IMG_C".

Figure 6:
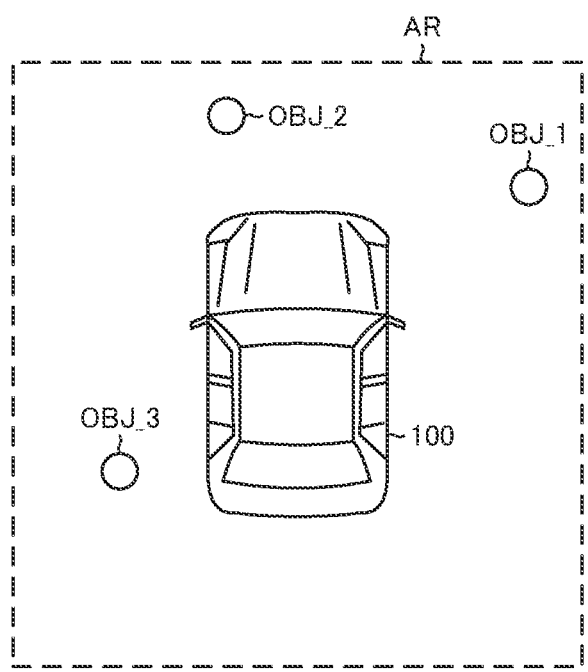
FIG. 6 is a view showing an example of a relationship in position between the vehicle and objects around the vehicle.

An area which the vehicle surrounding monitoring apparatus 10 can recognize the object(s) OBJ, based on the camera image information INF_C is limited. For example, as shown in FIG. 6, when (i) the area which the vehicle surrounding monitoring apparatus 10 can recognize the object(s) OBJ, based on the camera image information INF_C, is a recognition area AR, and (ii) a first object OBJ_1, a second object OBJ_2, and a third object OBJ_3 are in the recognition area AR, the vehicle surrounding monitoring apparatus 10 can recognize the first object OBJ_1, the second object OBJ_2, and the third object OBJ_3 as the objects. In this case, the vehicle surrounding monitoring apparatus 10 determines that there are the first object OBJ_1, the second object OBJ_2, and the third object OBJ_3 around the own vehicle 100, based on the camera image information INF_C. In other words, the vehicle surrounding monitoring apparatus 10 determines that the first object OBJ_1, the second object OBJ_2, and the third object OBJ_3 are in the camera images IMG_C. It should be noted that an area which the own vehicle 100 exists is outside the recognition area AR.

When the vehicle surrounding monitoring apparatus 10 determines that the object(s) OBJ is/are in the camera images IMG_C, the vehicle surrounding monitoring apparatus 10 acquires a moving direction(s) DIR of the object(s) OB determined as being in the camera images IMG_C (the this-time-detected object(s) OBJ). Then, the vehicle surrounding monitoring apparatus 10 memorizes the acquired moving direction(s) DIR as real-time object information. In an example shown in FIG. 6, the vehicle surrounding monitoring apparatus 10 acquires the moving direction DIR_1 of the first object OBJ_1, the moving direction DIR_2 of the second object OBJ_2, and the moving direction DIR_3 of the third object OBJ_3. Then, the vehicle surrounding monitoring apparatus 10 memorizes the moving directions DIR_1 to DIR_3 as the real-time object information. The moving direction DIR of the object OBJ can be acquired, based on the camera image information INF_C and/or the sonar information INF_S with a known technique.

The vehicle surrounding monitoring apparatus 10 determines whether the object(s) OBJ determined last time (at the time corresponding to the predetermined calculation cycle CYC_cal before) as being in the camera images IMG_C (the last-time-detected object(s) OBJ), is/are in the camera images IMG_C this time t_now, based on the camera image information INF_C. In other words, the vehicle surrounding monitoring apparatus 10 determines whether the object(s) OBJ detected last time by the camera sensor apparatus 20 is not detected this time by the camera sensor apparatus 20, based on the camera image information INF_C. Hereinafter, the time corresponding to the predetermined calculation cycle CYC_cal will be referred to as "predetermined time period T_cal".

When the vehicle surrounding monitoring apparatus 10 determines that the object(s) OBJ determined last time as being in the camera images IMG_C (the last-time-detected object(s) OBJ) is/are in the camera images IMG_C this time t_now, the vehicle surrounding monitoring apparatus 10 acquires the moving direction(s) DIR of the object(s) OBJ determined this time t_now as being in the camera images IMG_C (the this-time-detected object(s) OBJ). Then, the vehicle surrounding monitoring apparatus 10 memorizes the acquired moving direction(s) DIR as the real-time object information.

On the other hand, when the vehicle surrounding monitoring apparatus 10 determines that the object(s) OBJ determined last time as being in the camera images IMG_C (the last-time-detected object(s) OBJ), is/are not in the camera images IMG_C this time t_now, the vehicle surrounding monitoring apparatus 10 acquires the moving direction(s) DIR memorized last time of the object OBJ determined this time t_now as not being in the camera images IMG_C (the this-time-non-detected object(s) OBJ) as past object information. then, the vehicle surrounding monitoring apparatus 10 determines whether the acquired moving direction(s) DIR corresponds/correspond to a direction to reach the own vehicle 100 of this time. Hereinafter, the direction to reach the own vehicle 100 of this time will be simply referred to as "direction to reach the own vehicle 100".

Figure 7:
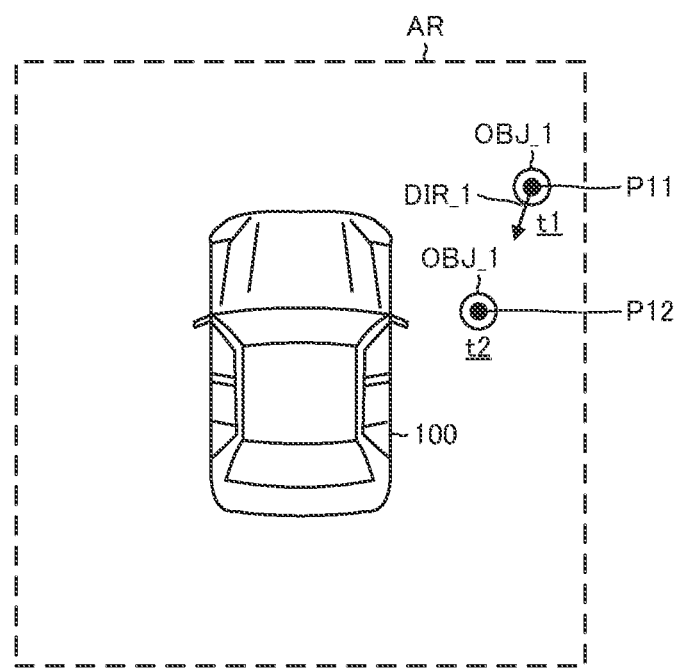
FIG. 7 is a view showing an example of the relationship in position between the vehicle and the object around the vehicle.

For example, when the first object OBJ_1 shown in FIG. 6 moves as shown in FIG. 7, the vehicle surrounding monitoring apparatus 10 functions as described below. In an example shown in FIG. 7, the first object OBJ_1 of a time t1 is at a position P11 and moves in the moving direction DIR_1, and the first object OBJ_1 of the present time t2 after the time t1 by the predetermined time period Tcal has moved to a position P12. The position P12 is in the recognition area AR. Thus, the vehicle surrounding monitoring apparatus 10 determines that the first object OBJ_1 of the present time t2 is in the camera images IMG_C. In this case, the vehicle surrounding monitoring apparatus 10 acquires the moving direction DIR_1 of the first object OBJ_1 of the present time t2. Then, the vehicle surrounding monitoring apparatus 10 memorizes the acquired moving direction DIR_1.

Figure 8:
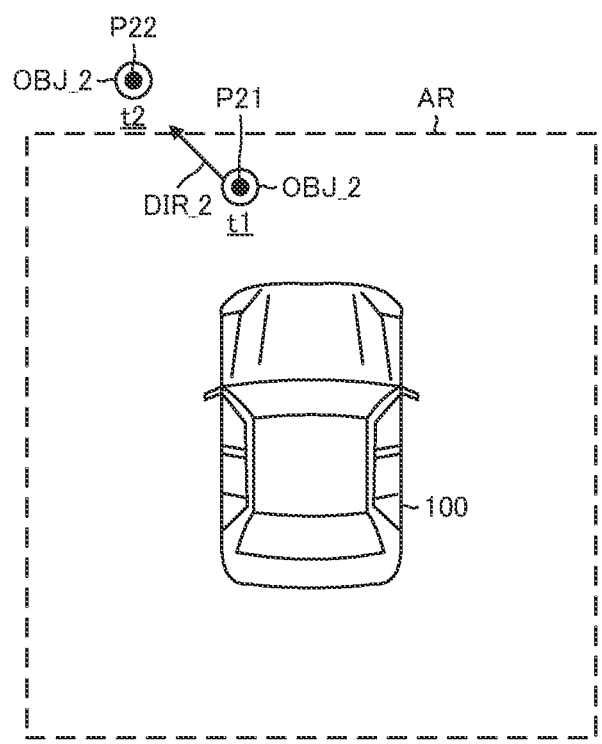
FIG. 8 is a view showing an example of the relationship in position between the vehicle and the object around the vehicle.

When the second object OBJ_2 shown in FIG. 6 moves as shown in FIG. 8, the vehicle surrounding monitoring apparatus 10 functions as described below. In an example shown in FIG. 8, the second object OBJ_2 of the time t1 is at a position P21 and moves in the moving direction DIR_2, and the second object OBJ_2 of the present time t2 after the time t by the predetermined time period T_cal has moved to a position P21. The position P22 is outside the recognition area AR. Thus, the vehicle surrounding monitoring apparatus 10 determines that the second object OBJ_2 of the present time t2 is not in the camera images IMG_C. In this case, the vehicle surrounding monitoring apparatus 10 determines whether the moving direction DIR_2 of the second object OBJ_2 memorized last time (i.e., at the time t1) corresponds to the direction to reach the own vehicle 100.

Figure 9:
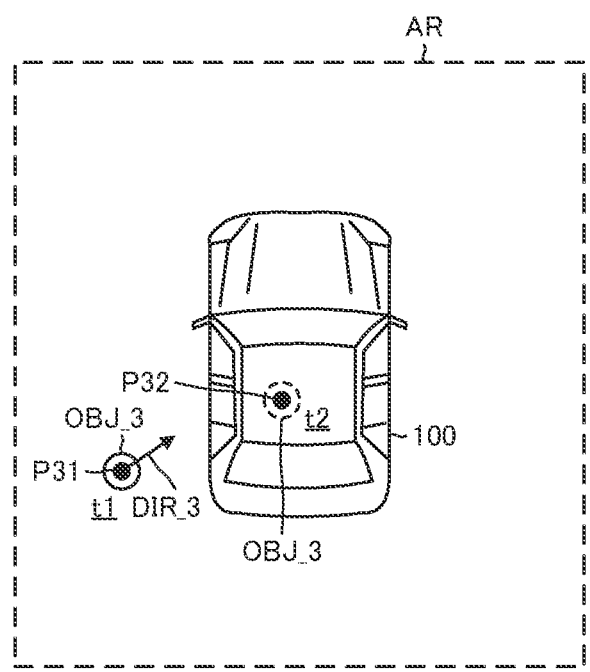
FIG. 9 is a view showing an example of the relationship in position between the vehicle and the object around the vehicle.

When the third object OBJ_3 shown in FIG. 6 moves as shown in FIG. 9, the vehicle surrounding monitoring apparatus 10 functions as described below. In an example shown in FIG. 9, the third object OBJ_3 of the time t1 is at a position P31 and moves in the moving direction DIR_3, and the third object OBJ_3 of the present time t2 after the time t1 by the predetermined time period T_cal has moved to a position P32. The position P32 is outside the recognition area AR. Thus, the vehicle surrounding monitoring apparatus 10 determines that the third object OBJ_3 of the present time t2 is not in the camera images IMG_C. In this case, the vehicle surrounding monitoring apparatus 10 determines whether the moving direction DIR_3 of the third object OBJ_3 memorized last time (i.e., at the time t1) corresponds to the direction to reach the own vehicle 100.

When the vehicle surrounding monitoring apparatus 10 determines that the moving direction DIR memorized last time of the object OBJ determined this time as not being in the camera images IMG_C (the this-time-non-detected object OBJ) does not correspond to the direction to reach the own vehicle 100, the vehicle surrounding monitoring apparatus 10 determines that there is not the this-time-non-detected object OBJ in the underfloor space SP. In this case, the vehicle surrounding monitoring apparatus 10 does not execute the underfloor object informing process.

In the example shown in FIG. 8, the moving direction DIR_2 memorized last time of the second object OBJ_2 determined at the present time t2 as not being in the camera images IMG_C does not correspond to the direction to reach the own vehicle 100. Thus, the vehicle surrounding monitoring apparatus 10 determines that there is not the second object OBJ_2 in the underfloor space SP.

On the other hand, when the vehicle surrounding monitoring apparatus 10 determines that the moving direction DIR memorized last time of the object OBJ determined this time as not being in the camera images IMG_C (the this-time-non-detected object OBJ) corresponds to the direction to reach the own vehicle 100, the vehicle surrounding monitoring apparatus 10 determines that there is the this-time-non-detected object OBJ probably in the underfloor space SP. In other words, when the vehicle surrounding monitoring apparatus 10 determines that the moving direction DIR memorized last time of the object OBJ determined this time as not being in the camera images IMG_C (the this-time-non-detected object OBJ) corresponds to the direction to reach the own vehicle 100, the vehicle surrounding monitoring apparatus 10 determines that an informing condition becomes satisfied. In this case, the vehicle surrounding monitoring apparatus 10 executes the underfloor object informing process.

In the example shown in FIG. 9, the moving direction DIR_3 memorized last time of the third object OBJ_3 determined at the present time t2 as not being in the camera images IMG_C corresponds to the direction to reach the own vehicle 100. Thus, the vehicle surrounding monitoring apparatus 10 determines that there is the third object OBJ_3 probably in the underfloor space SP. Then, the vehicle surrounding monitoring apparatus 10 executes the underfloor object informing process.

Thereby, the driver can exactly know the probability that there is/are the object(s) OBJ in the underfloor space SP.

In this embodiment, the vehicle surrounding monitoring apparatus 10 executes the underfloor object informing process as described below.

Figure 10A:
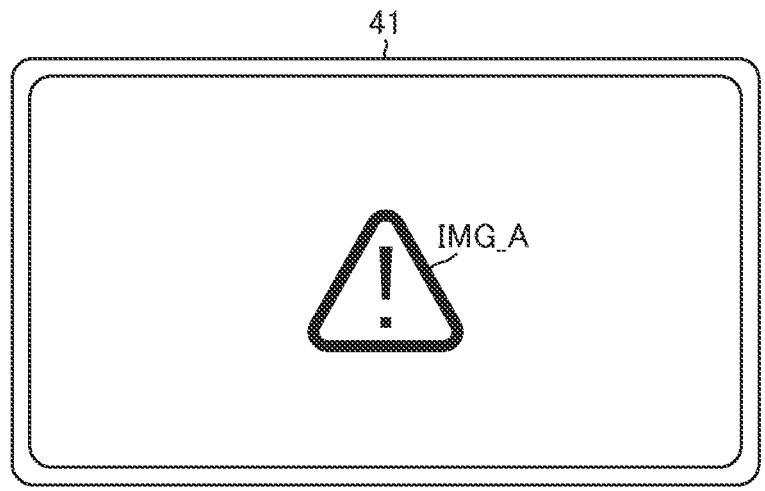
FIG. 10A is a view showing a display which displays an underfloor object informing image.

As shown in FIG. 10A, the vehicle surrounding monitoring apparatus 10 displays an underfloor object informing image IMG_A or an alerting image on the display 41. The underfloor object informing image IMG_A or the alerting image is to inform that there is/are the object(s) OBJ in the underfloor space SP of the own vehicle 100. The underfloor object informing image IMG_A is not limited to a specific image. For example, the underfloor object informing image IMG_A may be pictogram such as icon, symbol, diagram, letters, and text.

Figure 10B:
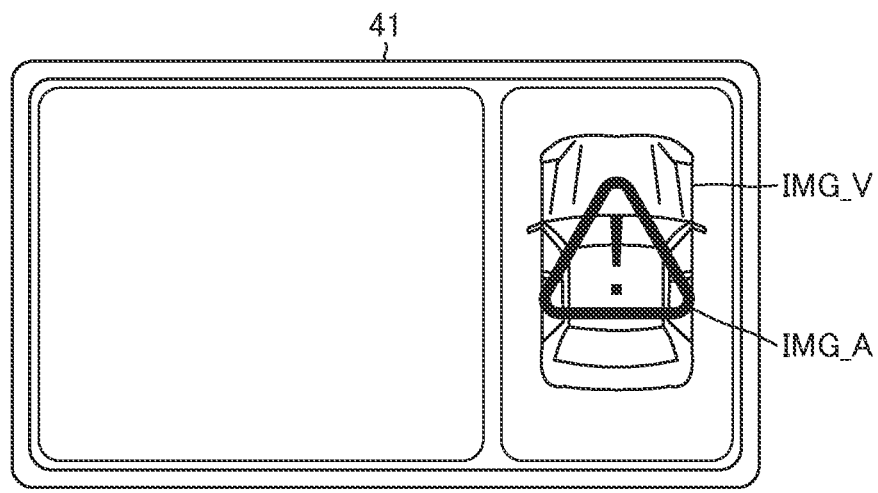
FIG. 10B is a view showing the display which displays another underfloor object informing image.
Figure 10C:
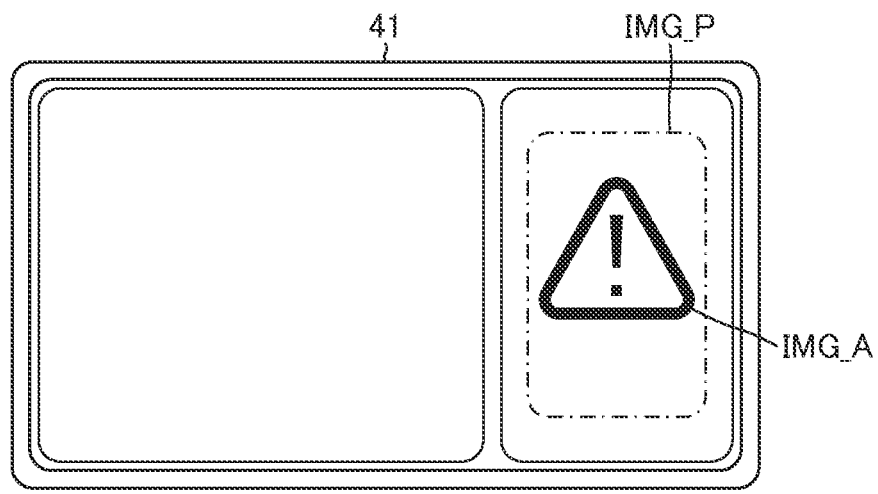
FIG. 10C is a view showing the display which displays further another underfloor object informing image.

Also, a position of the display 41 displaying the underfloor object informing image IMG_A is not limited to a specific position. For example, as shown in FIG. 10B, when a plane image IMG_P showing the own vehicle 100 from the above is displayed on the display 41, the vehicle surrounding monitoring apparatus 10 may display the underfloor object informing image IMG_A, overlapping the plane image IMG_P. Alternatively, as shown in FIG. 10C, when an underfloor image IMG_F showing the underfloor space SP of the own vehicle 100 is displayed on the display 41, the vehicle surrounding monitoring apparatus 10 may display the underfloor object informing image IMG_A, overlapping the underfloor image IMG_F. Alternatively, the vehicle surrounding monitoring apparatus 10 may display the underfloor object informing image IMG_A at an area of the display 41 which the plane image IMG_P and the underfloor image IMG_F are not displayed.

It should be noted that in this embodiment, the underfloor image IMG_F is produced with the known technique. For example, the camera image information INF_C is memorized with time of acquiring it. Then, the underfloor image IMG_F is produced, based on (i) the memorized camera image information INF_C, (ii) the steering angle STA, (iii) a wheel rotating direction DIR_R, (iv) the vehicle speed SPD_V, and (v) the present time. A moving direction of the own vehicle 100 can be recognized, based on the steering angle STA and the wheel rotating direction DIR_R. In addition, a moving distance DIS_V of the own vehicle 100 can be recognized, based on the vehicle speed SPD_V and the present time.

In addition to or in place of the underfloor object informing image IMG_A, the vehicle surrounding monitoring apparatus 10 may be configured to output an alert sound or voice (or announce) from the speaker 42 to inform the probability that there is/are the object(s) OBJ in the underfloor space SP.

Further, the vehicle surrounding monitoring apparatus 10 may be configured to stop the own vehicle 100 in addition to executing the underfloor object informing process. Alternatively, the vehicle surrounding monitoring apparatus 10 may be configured not to accelerate the own vehicle 100 even when the driver presses an acceleration pedal, i.e., configured to execute an acceleration override process.

<Specific Operation>

Next, a specific operation of the vehicle surrounding monitoring apparatus 10 will be described. The CPU of the ECU 90 of the vehicle surrounding monitoring apparatus 10 executes a routine shown in FIG. 11 with the predetermined calculation cycle CYC_cal.

Figure 11:
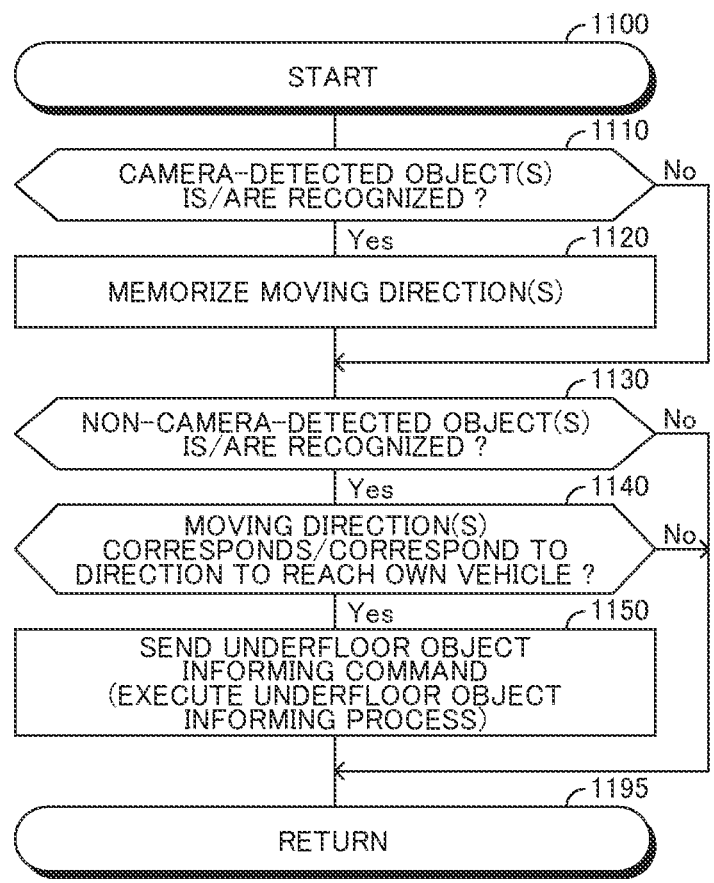
FIG. 11 is a flowchart of a routine executed by the vehicle surrounding monitoring apparatus according to the embodiment of the invention.

At a predetermined timing, the CPU starts executing a process from a step 1100 in FIG. 11 and proceeds with the process to a step 1110 to determine whether a camera-detected object(s) OBJ_C is/are recognized. The camera-detected object OBJ_C is the object OBJ which the CPU determines as being in the camera images IMG_C.

When the CPU determines "Yes" at the step 1110, the CPU proceeds with the process to a step 1120 to memorize the moving direction(s) DIR of the camera-detected object(s) OBJ_C as the real-time object information. Next, the CPU proceeds with the process to a step 1130.

On the other hand, when the CPU determines "No" at the step 1110, the CPU proceeds with the process directly to the step 1130.

When the CPU proceeds with the process to the step 1130, the CPU determines whether a non-camera-detected object(s) OBJ_N is/are recognized. The non-camera-detected object OBJ_N is the object OBJ which the CPU determines as being in the camera images IMG_C last time, but determines as not being in the camera images IMG_C this time.

When the CPU determines "Yes" at the step 1130, the CPU proceeds with the process to a step 1140 to acquire the memorized moving direction(s) DIR of the non-camera-detected object(s) OJB_N as the past object information. Then, the CPU determines whether the acquired moving direction(s) DIR corresponds/correspond to the direction to reach the own vehicle 100.

When the CPU determines "Yes" at the step 1140, the CPU proceeds with the process to a step 1150 to send an underfloor object informing command to the display 41. Thereby, the underfloor object informing image IMG_A is displayed on the display 41. Then, the CPU proceeds with the process to a step 1195 to terminate this routine once.

On the other hand, when the CPU determines "No" at the step 1130 or the step 1140, the CPU proceeds with the process directly to the step 1195 to terminate this routine once.

The specific operation of the vehicle surrounding monitoring apparatus 10 has been described.

First Modified Example

The vehicle surrounding monitoring apparatus 10 may not recognize the object(s) OBJ actually existing in the recognition area AR due to its image recognition ability. If the vehicle surrounding monitoring apparatus 10 does not recognize the object(s) actually existing in the recognition area AR (the actually-existing object(s) OBJ), the vehicle surrounding monitoring apparatus 10 determines that the object(s) OBJ is/are not in the camera images IMG_C. In this case, the vehicle surrounding monitoring apparatus 10 may determine that there is/are the object(s) OBJ probably in the underfloor space SP and execute the underfloor object informing process even when there is/are not the object(s) OBJ in the underfloor space SP. Accordingly, the vehicle surrounding monitoring apparatus 10 may be configured as described below.

When the vehicle surrounding monitoring apparatus 10 according to a first modified example of the embodiment of the invention determines that the object(s) OBJ exists/exist around the own vehicle 100, the vehicle surrounding monitoring apparatus 10 memorizes (i) the moving direction(s) DIR of the object(s) OBJ determined as existing around the own vehicle 100 (the existing-determined object(s) OBJ), (ii) a relative speed(s) SPD_R of the existing-determined object(s) OBJ relative to the own vehicle 100, and (iii) a distance(s) DIS_B between the existing-determined object(s) OBJ and the own vehicle 100 as the real-time object information.

The relative speed SPD_R can be acquired, based on (i) a moving speed SPD_O of the existing-determined object OBJ, (ii) the moving direction DIR of the existing-determined object OBJ, (iii) the vehicle speed SPD_V of the own vehicle 100, and (iv) the moving direction of the own vehicle 100. The moving speed SPD_O of the existing-determined object OBJ can be acquired, based on the camera image information INF_C and/or the sonar information INF_S with the known technique. Also, the distance DIS_B between the existing-determined object OBJ and the own vehicle 100 can be acquired, based on the camera image information INF_C and/or the sonar information INF_S with the known technique. Hereinafter, the distance DIS_B between the existing-determined object OBJ and the own vehicle 100 will be referred to as "relative distance DIS_B".

Each time the vehicle surrounding monitoring apparatus 10 determines that the object(s) OBJ is/are in the camera images IMG_C, the vehicle surrounding monitoring apparatus 10 memorizes (i) the moving direction(s) DIR of the object(s) OBJ determined as being in the camera images IMG_C (the this-time-detected object(s) OBJ), (ii) the relative speeds SPD_R of the this-time-detected object(s) OBJ relative to the own vehicle 100, and (iii) the relative distance DIS_B between the this-time-detected object(s) OBJ and the own vehicle 100 as the real-time object information.

On the other hand, when the vehicle surrounding monitoring apparatus 10 determines that the object(s) OBJ determined last time as being in the camera images IMG_C (the last-time-detected object(s)) is/are not in the camera images IMG_C this time, the vehicle surrounding monitoring apparatus 10 acquires the moving direction(s) DIR memorized last time of the object(s) OBJ determined last time as being in the camera images IMG_C, but determined this time as not being in the camera images IMG_C (the this-time-non-detected object(s) OBJ) as the past object information. Then, the vehicle surrounding monitoring apparatus 10 determines whether the acquired moving direction(s) DIR of the this-time-non-detected object(s) OBJ) corresponds/correspond to the direction to reach the own vehicle 100.

When the vehicle surrounding monitoring apparatus 10 determines that the moving direction(s) DIR memorized last time of the this-time-non-detected object(s) OBJ does/do not correspond to the direction to reach the own vehicle 100, the vehicle surrounding monitoring apparatus 10 determines that there is/are not the this-time-non-detected object(s) OBJ in the underfloor space SP. In this case, the vehicle surrounding monitoring apparatus 10 does not execute the underfloor object informing process.

On the other hand, when the vehicle surrounding monitoring apparatus 10 determines that the moving direction(s) DIR memorized last time of the this-time-non-detected object(s) OBJ corresponds/correspond to the direction to reach the own vehicle 100, the vehicle surrounding monitoring apparatus 10 calculates a distance(s) estimated for the this-time-non-detected object(s) to move for the predetermined time period T_cal as the moving distance(s) DIS_O. In other words, the vehicle surrounding monitoring apparatus 10 acquires the moving distance(s) DIS_O as the real-time object information. It should be noted that the moving distance DIS_O can be calculated, based on (i) the relative speed SPD_R of the object OBJ relative to the own vehicle 100 and (ii) the predetermined time period T_cal.

Then, the vehicle surrounding monitoring apparatus 10 determines whether the calculated moving distance(s) DIS_O is/are greater than the relative distance(s) memorized last time between the this-time-non-detected object(s) OBJ and the own vehicle 100.

When the vehicle surrounding monitoring apparatus 10 determines that the calculated moving distance(s) DIS_O is/are greater than the relative distance(s) memorized last time between the this-time-non-detected object(s) OBJ and the own vehicle 100, the vehicle surrounding monitoring apparatus 10 determines that there is/are the this-time-non-detected object(s) OBJ probably in the underfloor space SP.

Then, the vehicle surrounding monitoring apparatus 10 executes the underfloor object informing process.

In other words, when the vehicle surrounding monitoring apparatus 10 determines that (i) the moving direction(s) DIR memorized last time of the this-time-non-detected object(s) OBJ corresponds/correspond to the direction to reach the own vehicle 100, and (ii) the calculated moving distance(s) DIS_O is/are greater than the relative distance(s) memorized last time between the this-time-non-detected object(s) OBJ and the own vehicle 100, the vehicle surrounding monitoring apparatus 10 determines that the informing condition is satisfied.

Thereby, an execution of the underfloor object informing process when there is/are not the object(s) OBJ in the underfloor space SP, can be prevented.

In addition, whether there is/are the object(s) OBJ in the underfloor space SP, can be exactly determined even when the predetermined calculation cycle CYC_cal is set to a longer cycle. Thus, if the predetermined calculation cycle CYC_cal is set to a longer cycle, an amount of electric power consumed to execute the underfloor object informing process, can be reduced.

<Specific Operation>

Next, a specific operation of the vehicle surrounding monitoring apparatus 10 according to the first modified example will be described. The CPU of the ECU 90 of the vehicle surrounding monitoring apparatus 10 according to the first modified example executes a routine shown in FIG. 12 with the predetermined calculation cycle CYC_cal.

Figure 12:
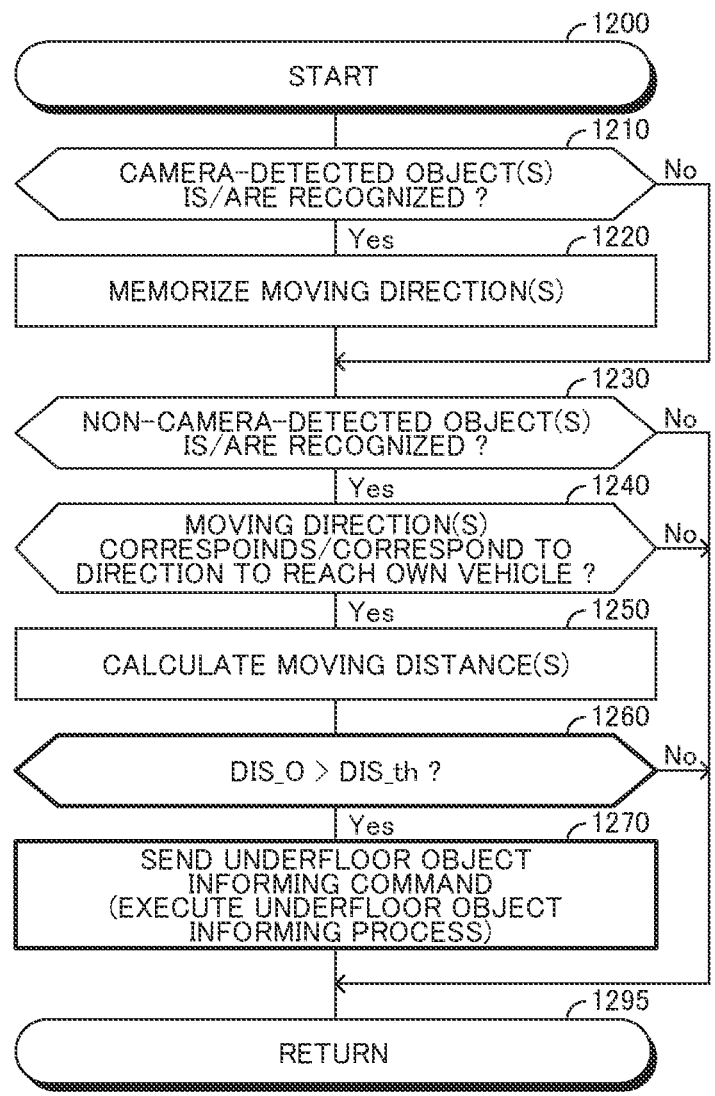
FIG. 12 is a flowchart of a routine executed by the vehicle surrounding monitoring apparatus according to a first modified example of the embodiment of the invention.

At a predetermined timing, the CPU starts executing a process from a step 1200 in FIG. 12 and proceeds with the process to a step 1210 to determine whether the camera-detected object(s) OBJ_C is/are recognized.

When the CPU determines "Yes" at the step 1210, the CPU proceeds with the process to a step 1220 to memorize the direction(s) DIR of the recognized camera-detected object(s) OBJ_C as the real-time object information. Next, the CPU proceeds with the process to a step 1230.

On the other hand, when the CPU determines "No" at the step 1210, the CPU proceeds with the process directly to the step 1230.

When the CPU proceeds with the process to the step 1230, the CPU determines whether the non-camera-detected object(s) OBJ_N is/are recognized.

When the CPU determines "Yes" at the step 1230, the CPU proceeds with the process to a step 1240 to acquire the memorized moving direction(s) DIR of the recognized non-camera-detected object(s) OJB_N as the past object information. Then, the CPU determines whether the acquired moving direction(s) DIR corresponds/correspond to the direction to reach the own vehicle 100.

When the CPU determines "Yes" at the step 1240, the CPU proceeds with the process to a step 1250 to calculate the moving distance(s) DIS_O of the recognized non-camera-detected object(s) OBJ_N as the real-time object information. Next, the CPU proceeds with the process to a step 1260 to determine whether the calculated moving distance(s) DIS_O is/are greater than a predetermined moving distance DIS_th.

When the CPU determines "Yes" at the step 1260, the CPU proceeds with the process to a step 1270 to send the underfloor object informing command to the display 41. Thereby, the underfloor object informing image IMG_A is displayed on the display 41. Then, the CPU proceeds with the process to a step 1295 to terminate this routine once.

On the other hand, when the CPU determines "No" at the step 1230 or the step 1240, the CPU proceeds with the process to the step 1295 to terminate this routine once.

The specific operation of the vehicle surrounding monitoring apparatus 10 according to the first modified example has been described.

Second Modified Example

Further, the vehicle surrounding monitoring apparatus 10 may be configured as described below. When the vehicle surrounding monitoring apparatus 10 according to a second modified example of the embodiment of the invention determines that the object(s) OBJ determined last time as being in the camera images IMG_C is/are not in the camera images IMG_C, the vehicle surrounding monitoring apparatus 10 determines whether the object(s) OBJ exists/exist in the direction(s) which the this-time-non-detected object(s) OBJ (the object(s) OBJ determined last time as being in the camera images IMG_C, but determined this time as not being in the camera images IMG_C) existed last time, based on the sonar information INF_S.

When the vehicle surrounding monitoring apparatus 10 determines that the object(s) OBJ exists/exist in the direction(s) which the this-time-non-detected object(s) OBJ existed last time, based on the sonar information INF_S, the vehicle surrounding monitoring apparatus 10 determines that there is/are not the this-time-non-detected object(s) OBJ in question in the underfloor space SP. In this case, the vehicle surrounding monitoring apparatus 10 does not execute the underfloor object informing process.

On the other hand, when the vehicle surrounding monitoring apparatus 10 determines that no objects OBJ exist in the directions which the this-time-non-detected objects OBJ existed last time, based on the sonar information INF_S, the vehicle surrounding monitoring apparatus 10 determines that there is/are the this-time-non-detected object(s) OBJ in question probably in the underfloor space SP. Then, the vehicle surrounding monitoring apparatus 10 executes the underfloor object informing process.

Thereby, when the vehicle surrounding monitoring apparatus 10 cannot recognize the object(s) OBJ actually existing in the recognition area AR due to its image recognition ability, the vehicle surrounding monitoring apparatus 10 detects the object(s), based on the sonar information INF_S. In this case, the underfloor object informing process is not executed. Thus, the execution of the underfloor object informing process when there is/are not the object(s) OBJ in the underfloor space SP, can be prevented.

<Specific Operation>

Next, a specific operation of the vehicle surrounding monitoring apparatus 10 according to the second modified example will be described. The CPU of the ECU 90 of the vehicle surrounding monitoring apparatus 10 according to the second modified example executes a routine shown in FIG. 13 with the predetermined calculation cycle CYC_cal.

Figure 13:
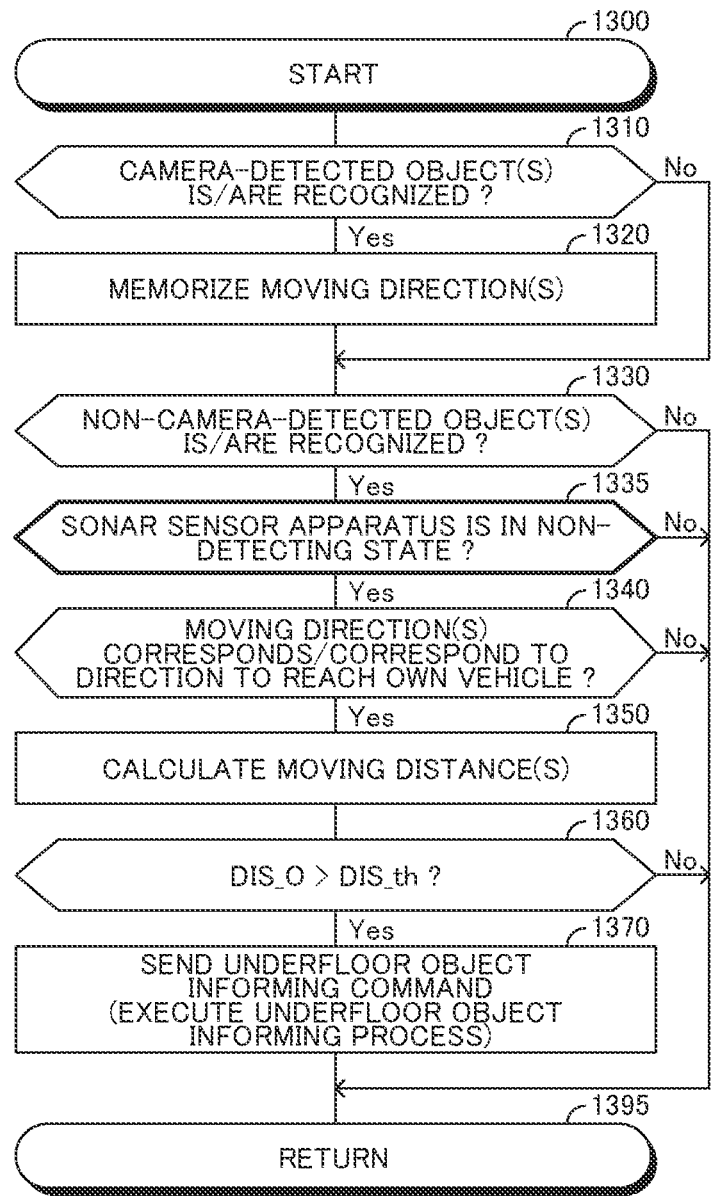
FIG. 13 is a flowchart of a routine executed by the vehicle surrounding monitoring apparatus according to a second modified example of the embodiment of the invention.

The routine shown in FIG. 13 is that a step 1335 is added to the routine shown in FIG. 12. Thus, processes of steps 1300 to 1330 and steps 1340 to 1395 in FIG. 13 are the same as the processes of the steps 1200 to 1230 and the steps 1240 to 1295 in FIG. 12, respectively.

Thus, when the CPU determines "Yes" at the step 1330, the CPU proceeds with the process to the step 1335 to determine whether the sonar sensor apparatus 30 is in a non-detecting state. The non-detecting state is a state that the sonar sensor apparatus 30 does not detect the non-camera-detected object(s) OBJ_N.

When the CPU determines "Yes" at the step 1335, the CPU proceeds with the process to the step 1340. On the other hand, when the CPU determines "No" at the step 1335, the CPU proceeds with the process directly to the step 1395 to terminate this routine once.

The specific operation of the vehicle surrounding monitoring apparatus 10 according to the second modified example has been described.

It should be noted that the invention is not limited to the aforementioned embodiments, and various modifications can be employed within the scope of the invention.

Third Modified Example

For example, when the driver parks the own vehicle 100 in a parking, the own vehicle 100 may be parked for long time with stopping an operation of an internal combustion engine of the own vehicle 100. While the own vehicle 100 is parked for long time with the own vehicle 100 deenergized, the object(s) OBJ may crawl into the underfloor space SP. Thus, if the vehicle surrounding monitoring apparatus 10 is also deenergized while the own vehicle 100 is deenergized, the vehicle surrounding monitoring apparatus 10 cannot detect the object(s) OBJ in the underfloor space SP while the own vehicle 100 is parked and deenergized. In this connection, if the vehicle surrounding monitoring apparatus 10 is kept energized while the own vehicle 100 is deenergized, the electric power of a battery of the own vehicle 100 is considerably consumed.

Accordingly, the vehicle surrounding monitoring apparatus 10 may be configured as described below. When a state of the own vehicle 100 is changed from an energized state to a deenergized state, the vehicle surrounding monitoring apparatus 10 according to a third modified example of the embodiment of the invention is not deenergized. While the own vehicle 100 is deenergized, the vehicle surrounding monitoring apparatus 10 acquires only the sonar information INF_S. When the vehicle surrounding monitoring apparatus 10 detects the object(s) OBJ approaching the own vehicle 100, based on the sonar information INF_S, the vehicle surrounding monitoring apparatus 10 activates the camera sensor apparatus 20 and acquires the camera image information INF_C. Then, the vehicle surrounding monitoring apparatus 10 determines whether there is/are the detected object(s) OB in the underfloor space SP, based on the camera image information INF_C as described above. When the vehicle surrounding monitoring apparatus 10 determines that there is/are the object(s) OBJ in the underfloor space SP, the vehicle surrounding monitoring apparatus 10 executes the underfloor object informing process when the state of the own vehicle 100 is changed from the deenergized state to the energized state.

Thereby, as far as no objects OBJ are detected, based on the sonar information INF_S while the own vehicle 100 is parked and deenergized, the vehicle surrounding monitoring apparatus 10 only acquires the sonar information INF_S. Thus, the amount of the electric power consumed from the battery of the own vehicle 100 can be kept small. When there is/are the object(s) OB probably in the underfloor space SP, the driver can know the probability that there is/are the object(s) OBJ in the underfloor space SP by the underfloor object informing process when the driver changes the state of the own vehicle 100 to the energized state.

When the vehicle surrounding monitoring apparatus 10 is installed on a hybrid or plug-in-hybrid vehicle (HV or PHV), the energized state is, for example, a state that the internal combustion engine and/or a motor of the hybrid or plug-inhybrid vehicle are/is ready to be operated in response to an operation to the acceleration pedal by the driver, and the deenergized state is, for example, a state that the internal combustion engine and the motor are not operated even when the driver operates the acceleration pedal. When the vehicle surrounding monitoring apparatus 10 is installed on an electric vehicle (EV), the energized state is, for example, a state that the motor of the electric vehicle is ready to be operated in response to the operation to the acceleration pedal by the driver, and the deenergized state is, for example, a state that the motor is not operated even when the driver operates the acceleration pedal.

<Specific Operation>

Next, a specific operation of the vehicle surrounding monitoring apparatus 10 according to the third modified example will be described. The CPU of the ECU 90 of the vehicle surrounding monitoring apparatus 10 according to the third modified example executes routines shown in FIGS. 14 and 15 with the predetermined calculation cycle CYC_cal when the own vehicle 100 is in the deenergized state.

Figure 14:
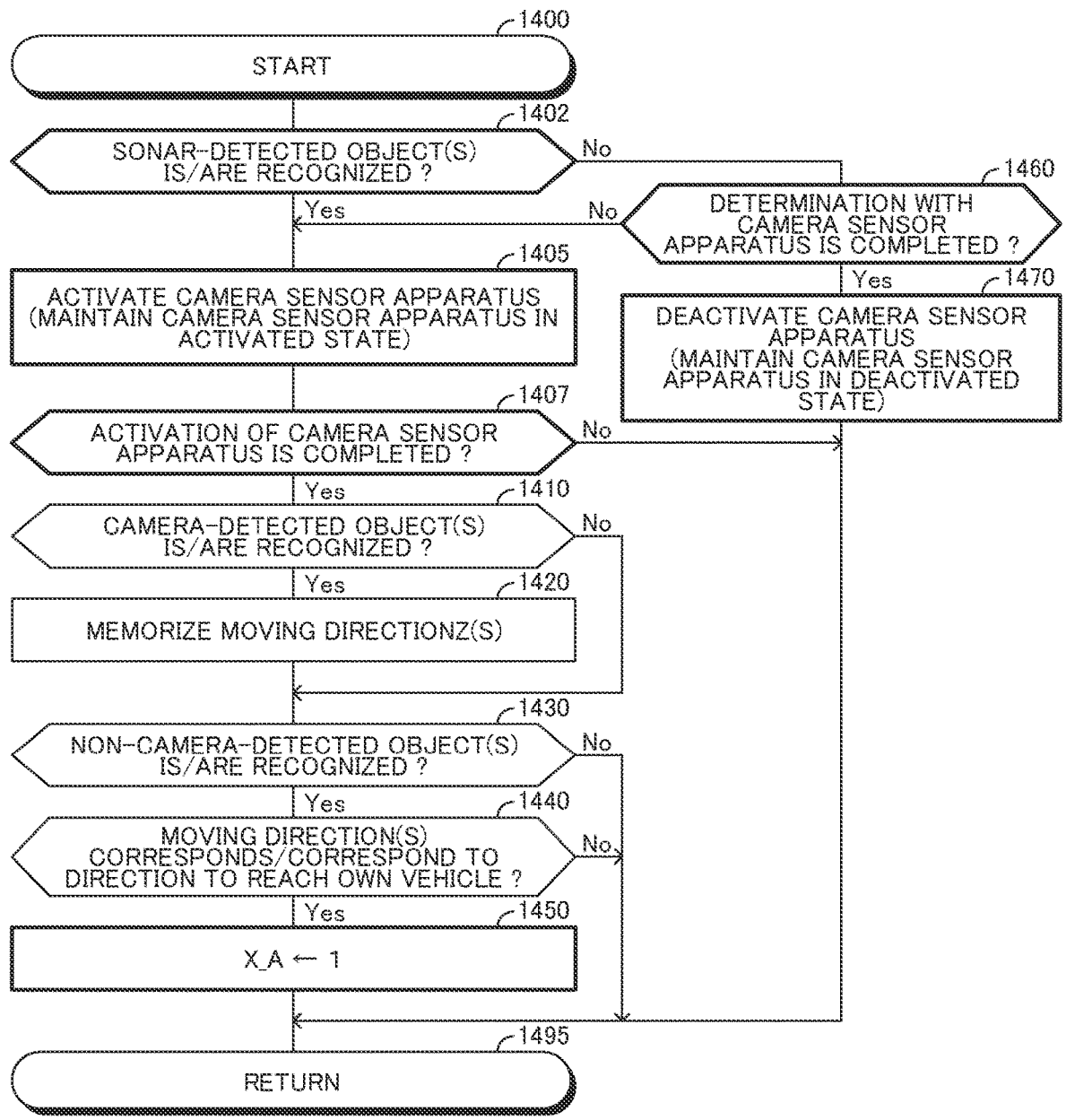
FIG. 14 is a flowchart of a routine executed by the vehicle surrounding monitoring apparatus according to a third modified example of the embodiment of the invention.

Processes of steps 1410 to 1440 in FIG. 14 are the same as the processes of the steps 1110 to 1140 in FIG. 11, respectively.

At a predetermined timing, the CPU starts executing a process from a step 1400 and proceeds with the process to a step 1402 to determine whether sonar-detected object(s) OBJ_S is/are recognized. The sonar object OB_S is the object OBJ which the CPU detects, based on the sonar information INF_S.

When the CPU determines "Yes" at the step 1402, the CPU proceeds with the process to a step 1405. At the step 1402, the CPU activates the camera sensor apparatus 20 when the camera sensor apparatus 20 is in a deactivated state. On the other hand, at the step 1402, the CPU maintains the camera sensor apparatus 20 in an activated state when the camera sensor apparatus 20 is in the activated state. Next, the CPU proceeds with the process to a step 1407 to determine whether an activation of the camera sensor apparatus 20 is completed.

When the CPU determines "Yes" at the step 1407, the CPU executes the processes of the step 1410 and the steps following it. When the CPU determines "Yes" at the step 1440, the CPU proceeds with the process to a step 1450 to set a value of an informing flag X_A to "1". Then, the CPU proceeds with the process to a step 1495 to terminate this routine once.

On the other hand, when the CPU determines "No" at the step 1407, the CPU proceeds with the process directly to the step 1495 to terminate this routine once.

When the CPU determines "No" at the step 1402, the CPU proceeds with the process to a step 1460 to determine whether a process of determining whether there is/are the object(s) OBJ in the underfloor space SP by the processes of the step 1410 and the steps following it, is completed.

When the CPU determines "Yes" at the step 1460, the CPU proceeds with the process to a step 1470. At the step 1470, the CPU deactivates the camera sensor apparatus 20 when the camera sensor apparatus 20 is in the activated state. On the other hand, at the step 1470, the CPU maintains the camera sensor apparatus 20 in the deactivated state when the camera sensor apparatus 20 is in the deactivated state. Then, the CPU proceeds with the process to the step 1495 to terminate this routine once.

On the other hand, when the CPU determines "No" at the step 1460, the CPU executes the processes of the step 1405 and the steps following it.

Figure 15:
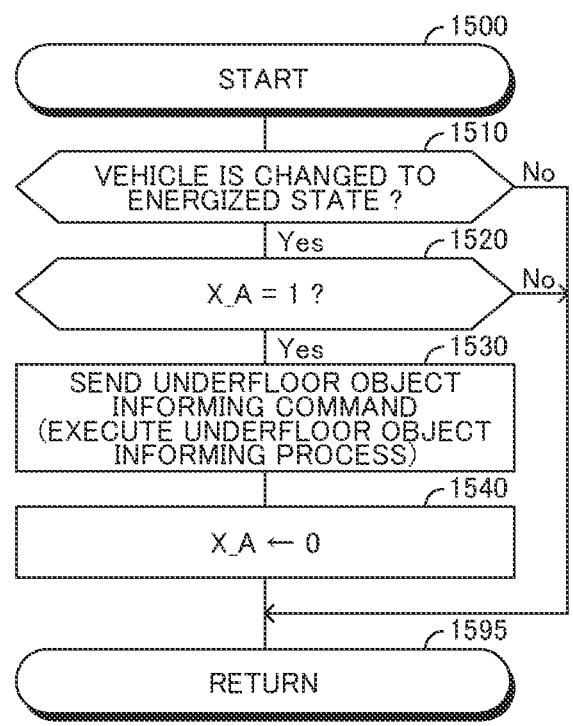
FIG. 15 is a flowchart of a routine executed by the vehicle surrounding monitoring apparatus according to the third modified example of the embodiment of the invention.

In addition, at a predetermined timing, the CPU starts executing a process from a step 1500 in FIG. 15 and proceeds with the process to a step 1510 to determine whether the state of the own vehicle 100 is changed from the deenergized state to the energized state.

When the CPU determines "Yes" at the step 1510, the CPU proceeds with the process to a step 1520 to determine whether the value of the informing flag X_A is "1".

When the CPU determines "Yes" at the step 1520, the CPU proceeds with the process to a step 1530 to send the underfloor object informing command to the display 41. Thereby, the underfloor object informing process is executed. Next, the CPU proceeds with the process to a step 1540 to set the value of the informing flag X_A to "0". Then, the CPU proceeds with the process to a step 1595 to terminate this routine once.

On the other hand, when the CPU determines "No" at the step 1510 or the step 1520, the CPU proceeds with the process directly to the step 1595 to terminate this routine once.

The specific operation of the vehicle surrounding monitoring apparatus 10 according to the third modified example has been described.

Fourth Modified Example

Further, the vehicle surrounding monitoring apparatus 10 may be configured as described below. When the state of the own vehicle 100 is changed from the energized state to the deenergized state, the vehicle surrounding monitoring apparatus 10 according to a fourth modified example of the embodiment of the invention is not deenergized. While the own vehicle 100 is deenergized, the acquires only the acceleration information INF_G. When the vehicle surrounding monitoring apparatus 10 detects a movement of the own vehicle 100, based on the acceleration information INF_G, the vehicle surrounding monitoring apparatus 10 activates the camera sensor apparatus 20 and acquires the camera image information INF_C. Then, the vehicle surrounding monitoring apparatus 10 determines whether the object(s) OBJ is/are in the camera images IMG_C, based on the camera image information INF_C. When the vehicle surrounding monitoring apparatus 10 determines that no objects OBJ are in the camera images IMG_C, the vehicle surrounding monitoring apparatus 10 determines that there is/are the object(s) OB in the underfloor space SP. When the vehicle surrounding monitoring apparatus 10 determines that there is/are the object(s) OBJ in the underfloor space SP, the vehicle surrounding monitoring apparatus 10 executes the underfloor object informing process when the state of the own vehicle 100 is changed from the deenergized state to the energized state.

Thereby, as far as no objects OBJ are detected, based on the acceleration information INF_G while the own vehicle 100 is parked and deenergized, the vehicle surrounding monitoring apparatus 10 only acquires the acceleration information INF_G. Thus, the amount of the electric power consumed from the battery of the own vehicle 100 can be kept small. When there is/are the object(s) OBJ probably in the underfloor space SP, the driver can know the probability that there is/are the object(s) OBJ in the underfloor space SP by the underfloor object informing process when the driver changes the state of the own vehicle 100 to the energized state.

<Specific Operation>

Next, a specific operation of the vehicle surrounding monitoring apparatus 10 according to the fourth modified example will be described. The CPU of the ECU 90 of the vehicle surrounding monitoring apparatus 10 according to the fourth modified example executes a routine shown in FIG. 16 as well as the routine shown in FIG. 15 with the predetermined calculation cycle CYC_cal while the own vehicle 100 is in the deenergized state.

Figure 16:
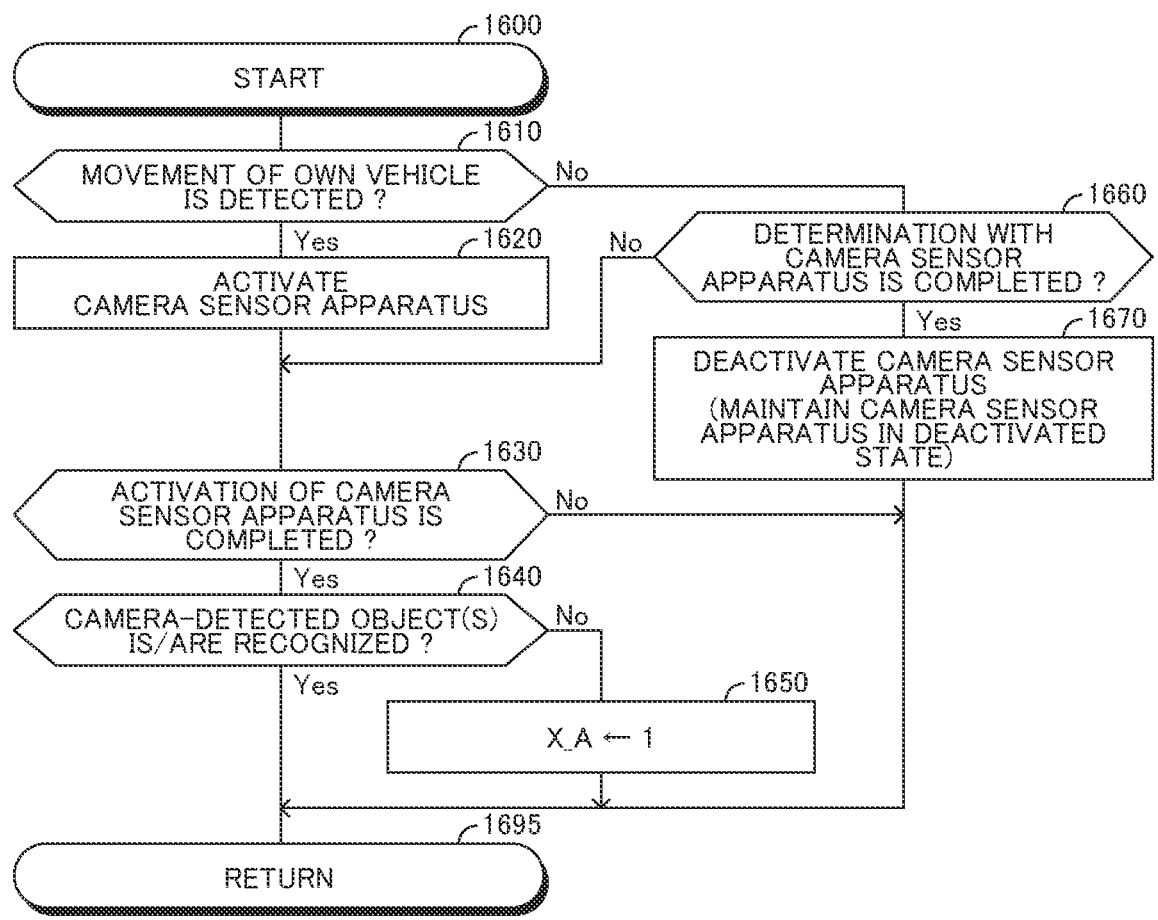
FIG. 16 is a flowchart of a routine executed by the vehicle surrounding monitoring apparatus according to a fourth modified example of the embodiment of the invention.

At a predetermined timing, the CPU starts executing a process from a step 1600 in FIG. 16 and proceeds with the process to a step 1610 to determine whether the CPU detects the movement of the own vehicle 100, based on the acceleration information INF_G.

When the CPU determines "Yes" at the step 1610, the CPU proceeds with the process to a step 1620 to activate the camera sensor apparatus 20. Next, the CPU proceeds with the process to a step 1630 to determine whether the activation of the camera sensor apparatus 20 is completed.

When the CPU determines "Yes" at the step 1630, the CPU proceeds with the process to a step 1640 to determine whether the camera-detected object(s) OBJ_C is/are recognized.

When the CPU determines "Yes" at the step 1640, the CPU proceeds with the process to a step 1695 to terminate this routine once. In this case, the underfloor object informing process is not executed.

On the other hand, when the CPU determines "No" at the step 1640, the CPU proceeds with the process to a step 1650 to set the value of the informing flag X_A to "1". Thereby, the process of the step 1530 in FIG. 15 is executed and as a result, the underfloor object informing process is executed. Then, the CPU proceeds with the process to the step 1695 to terminate this routine once.

When the CPU determines "No" at the step 1630, the CPU proceeds with the process directly to the step 1695 to terminate this routine once.

When the CPU determines "No" at the step 1610, the CPU proceeds with the process to a step 1660 to determine whether the process of the step 1640 of determining whether there is/are the object(s) OBJ in the underfloor space SP, is completed.

When the CPU determines "Yes" at the step 1660, the CPU proceeds with the process to a step 1670. At the step 1670, the CPU deactivates the camera sensor apparatus 20 when the camera sensor apparatus 20 is in the activated state. On the other hand, the CPU maintains the camera sensor apparatus 20 in the deactivated state when the camera sensor apparatus 20 is in the deactivated state. Then, the CPU proceeds with the process to the step 1695 to terminate this routine once.

On the other hand, when the CPU determines "No" at the step 1660, the CPU executes the processes of the step 1630 and the steps following it.

The specific operation of the vehicle surrounding monitoring apparatus 10 according to the fourth modified example has been described.

Fifth Modified Example

Further, when the own vehicle 100 is installed with a vehicle height adjusting apparatus such as air suspensions for adjusting a vehicle height, the vehicle surrounding monitoring apparatus 10 may be configured as described below. When the state of the own vehicle 100 is changed or requested to be changed from the energized state to the deenergized state, the vehicle surrounding monitoring apparatus 10 according to a fifth modified example of the embodiment of the invention lowers the vehicle height of the own vehicle 100 by the vehicle height adjusting apparatus to a height which the objects OBJ cannot crawl into the underfloor space SP. Thereby, the objects OBJ can be prevented from crawling into the underfloor space SP while the own vehicle 100 is parked and deenergized for long time.

Sixth Modified Example

Further, when the own vehicle 100 is installed with a barrier apparatus which projects barriers such as fences downwards from a lower wall surface of the floor 100U of the own vehicle 100, the vehicle surrounding monitoring apparatus 10 may be configured as described below. When the state of the own vehicle 100 is changed or requested to be changed from the energized state to the deenergized state, the vehicle surrounding monitoring apparatus 10 according to a sixth modified example of the embodiment of the invention projects the barriers downwards from the lower wall surface of the floor 100U of the own vehicle 100 to near the ground GR. Thereby, the objects OBJ can be prevented from moving into the underfloor space SP while the own vehicle 100 is parked and deenergize for long time.

What is claimed is:

1. A vehicle surrounding monitoring apparatus for executing an underfloor object informing process for informing occupants of an own vehicle of a probability that there is at least one object under a floor of the own vehicle, the vehicle surrounding monitoring apparatus comprising:
    a detecting apparatus including a sensor which detects a situation around the own vehicle; and
    an electronic control unit which executes the underfloor object informing process, wherein the electronic control unit is configured to:
    acquire detection information on the situation around the own vehicle detected by the detecting apparatus;
    when the electronic control unit determines that the detecting apparatus detects at least one object around the own vehicle, based on the detection information, memorize information on the detected object as real-time object information;
    when the electronic control unit determines that the detecting apparatus does not detect the object which the detecting apparatus had detected, based on the detection information, acquire information on a moving of the object which the detecting apparatus had detected for a predetermined time period as past object information, based on the memorized real-time object information;
    when the electronic control unit determines that there is the object which the detecting apparatus had detected under the floor of the own vehicle, based on the past object information, determine that an informing condition is satisfied; and
    when the electronic control unit determines that the informing condition is satisfied, execute the underfloor object informing process, wherein:
    the real-time object information includes a moving direction of the detected object, a relative distance between the detected object and the own vehicle, and a relative speed of the detected object relative to the own vehicle;
    the past object information includes the moving direction of the detected object memorized as the real-time object information, and a moving distance of the detected object for the predetermined time period calculated, based on the predetermined time period and the relative speed memorized as the real-time object information; and the electronic control unit is configured to determine that the informing condition is satisfied when the moving direction of the detected object acquired as the past object information corresponds to a direction to reach the own vehicle, and the calculated moving distance is greater than the memorized relative distance.

2. The vehicle surrounding monitoring apparatus as set forth in claim 1, wherein:
the vehicle surrounding monitoring apparatus comprises a display;
the detecting apparatus includes a camera sensor apparatus; and
the electronic control unit is configured to:
display an underfloor image on the display, the underfloor image being an image of a space under the floor of the own vehicle of this time produced, based on images taken by the camera sensor apparatus; and
when the electronic control unit determines that the informing condition is satisfied, execute the underfloor object informing process by displaying an underfloor object informing image on the display, overlapping the underfloor image to direct the occupants' attention to the space under the floor of the own vehicle.

3. The vehicle surrounding monitoring apparatus as set forth in claim 1, wherein the electronic control unit is configured to execute a process of determining whether the informing condition is satisfied when a moving speed of the own vehicle is smaller than or equal to a predetermined speed.

4. The vehicle surrounding monitoring apparatus as set forth in claim 1, wherein the electronic control unit is configured to execute a process of determining whether the informing condition is satisfied when a moving speed of the own vehicle is zero.

5. A vehicle surrounding monitoring apparatus for executing an underfloor object informing process for informing occupants of an own vehicle of a probability that there is at least one object under a floor of the own vehicle,
the vehicle surrounding monitoring apparatus comprising:
a detecting apparatus including a sensor which detects a situation around the own vehicle; and
an electronic control unit which executes the underfloor object informing process,
wherein the electronic control unit is configured to:
acquire detection information on the situation around the own vehicle detected by the detecting apparatus;
when the electronic control unit determines that the detecting apparatus detects at least one object around the own vehicle, based on the detection information, memorize information on the detected object as real-time object information;
when the electronic control unit determines that the detecting apparatus does not detect the object which the detecting apparatus had detected, based on the detection information, acquire information on a moving of the object which the detecting apparatus had detected for a predetermined time period as past object information, based on the memorized real-time object information;
when the electronic control unit determines that there is the object which the detecting apparatus had detected under the floor of the own vehicle, based on the past object information, determine that an informing condition is satisfied; and when the electronic control unit determines that the informing condition is satisfied, execute the underfloor object informing process,
wherein:
the detecting apparatus includes a camera sensor apparatus and an electromagnetic wave sensor apparatus; and
the electronic control unit is configured to:
when the own vehicle is deenergized, acquire the detection information from the electromagnetic wave sensor apparatus without acquiring the detection information from the camera sensor apparatus;
when the electronic control unit determines that the electromagnetic wave sensor apparatus detects the object around the own vehicle, based on the detection information acquired from the electromagnetic wave sensor apparatus, acquire the detection information from the camera sensor apparatus;
memorize the real-time object information, based on the detection information acquired from the camera sensor apparatus; and
when the electronic control unit determines that the camera sensor apparatus does not detect the object which the camera sensor apparatus had detected, based on the detection information acquired from the camera sensor apparatus, acquire the past object information, based on the memorized real-time object information.

6. The vehicle surrounding monitoring apparatus as set forth in claim 5, wherein the electronic control unit is configured to execute the underfloor object informing process when the informing condition is satisfied, and the own vehicle is energized.

7. A vehicle surrounding monitoring apparatus for executing an underfloor object informing process for informing occupants of an own vehicle of a probability that there is at least one object under a floor of the own vehicle,
the vehicle surrounding monitoring apparatus comprising:
a detecting apparatus including a sensor which detects a situation around the own vehicle; and
an electronic control unit which executes the underfloor object informing process,
wherein the electronic control unit is configured to:
acquire detection information on the situation around the own vehicle detected by the detecting apparatus;
when the electronic control unit determines that the detecting apparatus detects at least one object around the own vehicle, based on the detection information, memorize information on the detected object as real-time object information;
when the electronic control unit determines that the detecting apparatus does not detect the object which the detecting apparatus had detected, based on the detection information, acquire information on a moving of the object which the detecting apparatus had detected for a predetermined time period as past object information, based on the memorized real-time object information;
when the electronic control unit determines that there is the object which the detecting apparatus had detected under the floor of the own vehicle, based on the past object information, determine that an informing condition is satisfied; and
when the electronic control unit determines that the informing condition is satisfied, execute the underfloor object informing process, wherein:

the vehicle surrounding monitoring apparatus comprises an acceleration sensor which detects an acceleration of the own vehicle;

the detecting apparatus includes a camera sensor apparatus; and the electronic control unit is configured to:

when the own vehicle is deenergized, acquire information from the acceleration sensor without acquiring the detection information from the camera sensor apparatus;

when the electronic control unit determines that a movement of the own vehicle is detected, based on the information acquired from the acceleration sensor, acquire the detection information from the camera sensor apparatus;

memorize the real-time object information, based on the detection information acquired from the camera sensor apparatus; and when the electronic control unit determines that the camera sensor apparatus does not detect the object which the camera sensor apparatus had detected, based on the detection information acquired from the camera sensor apparatus, acquire the past object information, based on the memorized real-time object information.

8. The vehicle surrounding monitoring apparatus as set forth in claim 7, wherein the electronic control unit is configured to execute the underfloor object informing process when the informing condition is satisfied, and the own vehicle is energized.

* * * * *